US009352743B2

(12) United States Patent
Davis et al.

(10) Patent No.: US 9,352,743 B2
(45) Date of Patent: May 31, 2016

(54) HYDRAULIC HYBRID SYSTEM

(71) Applicant: Stored Energy Solutions Inc., Anderson, IN (US)

(72) Inventors: Robert Dane Davis, Fishers, IN (US); Robert James Sikorski, Stow, OH (US)

(73) Assignee: STORED ENERGY SOLUTIONS INC., Anderson, IN (US)

( * ) Notice: Subject to any disclaimer, the term of this patent is extended or adjusted under 35 U.S.C. 154(b) by 0 days.

(21) Appl. No.: 14/215,860

(22) Filed: Mar. 17, 2014

(65) Prior Publication Data

US 2014/0274522 A1 Sep. 18, 2014

Related U.S. Application Data

(60) Provisional application No. 61/788,774, filed on Mar. 15, 2013.

(51) Int. Cl.
*B60W 20/00* (2006.01)
*F15B 1/02* (2006.01)
(Continued)

(52) U.S. Cl.
CPC ............... *B60W 20/10* (2013.01); *B60K 6/12* (2013.01); *B60P 1/00* (2013.01); *B60W 10/00* (2013.01); *E02F 9/2217* (2013.01); *F15B 1/024* (2013.01); *F15B 21/14* (2013.01); *F17C 1/00* (2013.01); *G05B 11/00* (2013.01); *E02F 9/202* (2013.01); *E02F 9/2075* (2013.01); *F15B 1/08* (2013.01); *F15B 2201/205* (2013.01); *F15B 2201/32* (2013.01); *Y02T 10/6208* (2013.01)

(58) Field of Classification Search
None
See application file for complete search history.

(56) References Cited

U.S. PATENT DOCUMENTS 5,486,018 A   1/1996 Sakai
8,038,230 B2  10/2011 Nakamura
(Continued)

FOREIGN PATENT DOCUMENTS

DE   10 2009 001 357 A1   9/2010
EP   2196338                10/2011
(Continued)

OTHER PUBLICATIONS

International Search Report dated Aug. 21, 2014 as received in Application No. PCT/US2014/030595.
(Continued)

*Primary Examiner* — Ramya Burgess
*Assistant Examiner* — Timothy M Hannon
(74) *Attorney, Agent, or Firm* — Maschoff Brennan

(57) ABSTRACT

A hydraulic hybrid system for implementation in a machine. The system includes a hydraulic system, an energy source, an output, and a transmission. The hydraulic system includes a primary hydraulic pump/motor (primary motor) that is hydraulically coupled to a reservoir and a variable-volume accumulator assembly. The primary motor is configured to charge an accumulator of the variable-volume accumulator assembly with a working fluid when mechanically driven. The storage volume of variable-volume accumulator assembly varies based on a kinetic output condition of the machine. The energy source is configured to produce primary kinetic energy. The output is configured to receive at least a first portion of the primary kinetic energy. The transmission is coupled between the energy source and the output and selectively coupled to the primary motor. The transmission is configured to mechanically drive the primary motor using a second portion of the primary kinetic energy.

20 Claims, 12 Drawing Sheets

(51) Int. Cl.
*B60K 6/12* (2006.01)
*E02F 9/22* (2006.01)
*B60P 1/00* (2006.01)
*B60W 10/00* (2006.01)
*F17C 1/00* (2006.01)
*G05B 11/00* (2006.01)
*F15B 21/14* (2006.01)
*E02F 9/20* (2006.01)
*F15B 1/08* (2006.01)

(56) References Cited

U.S. PATENT DOCUMENTS

| | | | |
|---|---|---|---|
| 8,123,235 | B2 | 2/2012 | Monk et al. |
| 8,201,582 | B2 | 6/2012 | Stroganov et al. |
| 2004/0103656 | A1* | 6/2004 | Frazer et al. ............... 60/414 |
| 2006/0068970 | A1* | 3/2006 | Rose ............................ 477/34 |
| 2009/0165451 | A1 | 7/2009 | Mueller et al. |
| 2009/0191068 | A1 | 7/2009 | St. Aubin et al. |
| 2009/0211239 | A1* | 8/2009 | Askeland ...................... 60/327 |
| 2012/0042644 | A1 | 2/2012 | Noack |
| 2012/0055144 | A1 | 3/2012 | Pitzal et al. |
| 2013/0000094 | A1* | 1/2013 | Ma et al. ................... 29/402.08 |
| 2013/0153073 | A1 | 6/2013 | Barth et al. |
| 2014/0174065 | A1* | 6/2014 | Ma ................................ 60/327 |

FOREIGN PATENT DOCUMENTS

| | | |
|---|---|---|
| GB | 2370612 | 7/2002 |
| RU | 2 214 928 C2 | 10/2003 |
| RU | 2 355 591 C2 | 5/2009 |

OTHER PUBLICATIONS

Written Opinion of the International Searching Authority dated Aug. 21, 2014 as received in Application No. PCT/US2014/030595.

* cited by examiner

HYDRAULIC HYBRID SYSTEM

CROSS REFERENCE TO RELATED APPLICATIONS

This patent application claims priority to and the benefit of U.S. Provisional Patent Application No. 61/788,774, filed Mar. 15, 2013, which is incorporated herein by reference in its entirety.

FIELD

The embodiments discussed herein are related to hybrid systems. In particular, some embodiments relate to hydraulic hybrid systems.

BACKGROUND

Hybrid systems generally relate to the inclusion of two technologies to increase the overall efficiency of a system. An example hybrid system is a gasoline/electric hybrid vehicle. In the gasoline/electric hybrid vehicle an electrical motor operates in tandem with a fossil fuel engine. The electrical motor and the fossil fuel engine cooperate to generate energy to move the hybrid vehicle. Hydraulic hybrid systems incorporate a hydraulic system with another technology (usually a fossil fuel engine or a motor) to increase the efficiency of a system including both. For example, a fossil fuel engine may store potential energy in a hydraulic accumulator. The potential energy may be recouped later by discharging the hydraulic accumulator to provide kinetic energy to the system.

The subject matter claimed herein is not limited to embodiments that solve any disadvantages or that operate only in environments such as those described above. Rather, this background is only provided to illustrate one example technology area where some embodiments described herein may be practiced.

SUMMARY

An example embodiment includes a hydraulic hybrid system for implementation in a machine. The system includes a hydraulic system, an energy source, an output, and a transmission. The hydraulic system includes a primary hydraulic pump/motor (primary motor) that is hydraulically coupled to a reservoir and a variable-volume accumulator assembly. The primary pump/motor is configured to charge an accumulator of the variable-volume accumulator assembly with a working fluid when mechanically driven. The storage volume of the variable-volume accumulator assembly varies based on a kinetic output condition of the machine. The energy source is configured to produce primary kinetic energy. The output is configured to receive at least a first portion of the primary kinetic energy. The transmission is coupled between the energy source and the output and selectively coupled to the primary pump/motor. The transmission is configured to mechanically drive the primary pump/motor using a second portion of the primary kinetic energy.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Some existing hydraulic hybrid systems are limited in applicability due to inefficiencies associated with storage of potential energy. Specifically, some hydraulic hybrid vehicles may include one or more accumulators with fixed volumes. Depending on the operating characteristics of the hydraulic hybrid vehicle, the fixed volumes may ineffectively receive and store potential energy causing losses in overall efficiency of the system. For example, when a hydraulic hybrid vehicle is travelling at a speed below some threshold, a pressure received by the hydraulic accumulators may not sufficiently build a usable potential energy. However, at a second speed above the threshold the hydraulic accumulator may charge. Thus, potential energy stored in the hydraulic accumulator may only be recouped when the hydraulic hybrid vehicle is operating within a subset of operating conditions, leading to inefficient energy storage.

An example embodiment includes a regenerative hydraulic circuit. The regenerative hydraulic circuit is configured to capture kinetic energy from a machine and store the kinetic energy as hydraulic potential energy in an accumulator having a variable-volume. When the kinetic output of the machine is low a storage volume of the accumulator may be decreased resulting in adequate predetermined system pressure for when the vehicle is stopped. The storage volume may be adjusted through control of a fluid into a control volume of the accumulator. The control of the fluid may be volumetrically dependent on the kinetic output of the machine. As the kinetic output of the machine increases, the storage volume of the accumulator increases to capture an increased kinetic energy. The storage volume is configured to vary infinitely within the overall kinetic output range of the machine. Some additional embodiments are explained with reference to the accompanying drawings.

Figure 1:
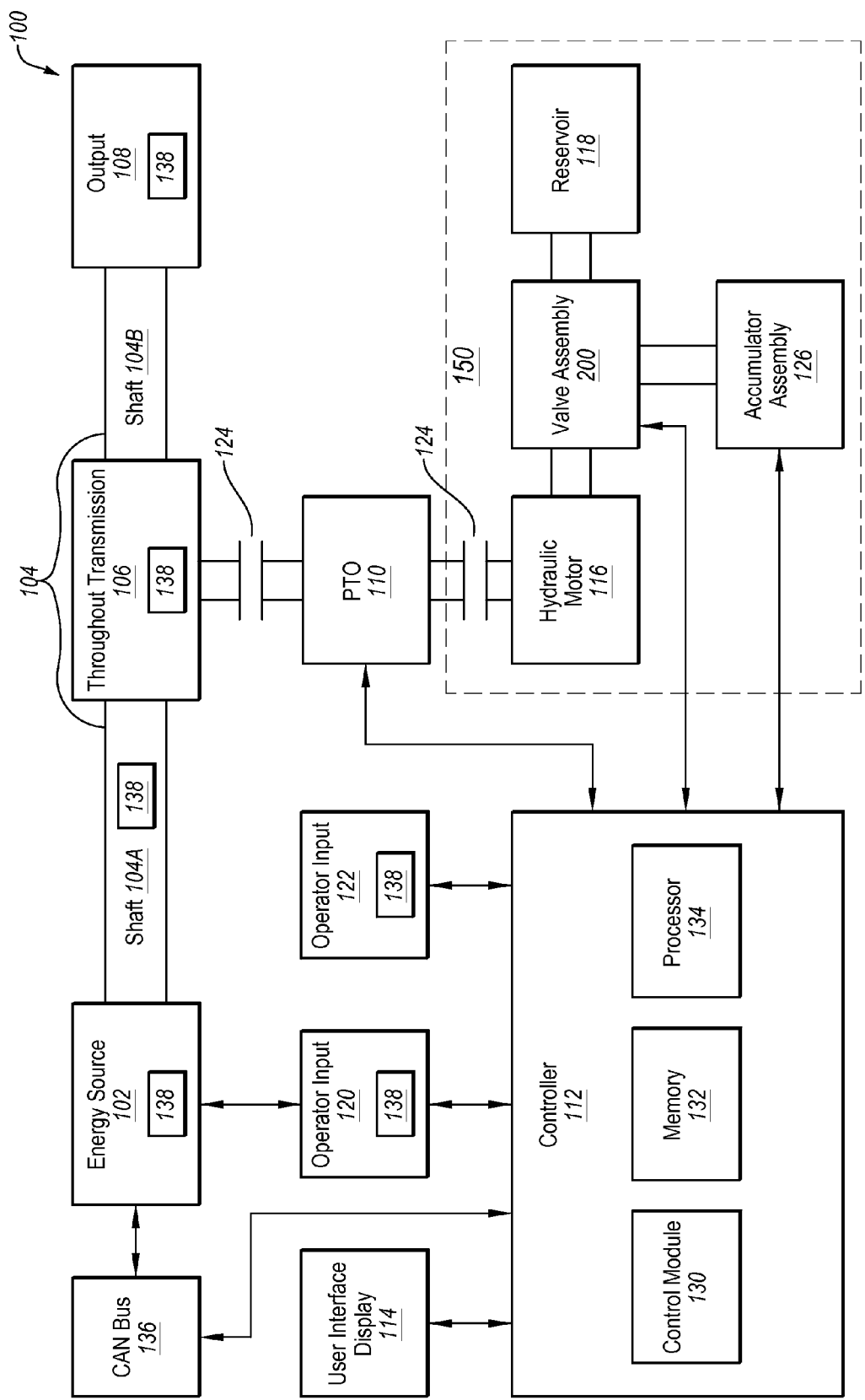
FIG. 1 illustrates a block diagram of an example hydraulic hybrid system.

FIG. 1 illustrates a block diagram of an example hydraulic hybrid system 100. The hydraulic hybrid system 100 is generally a regenerative hydraulic system. The hydraulic hybrid system 100 enables capture of kinetic energy that may be otherwise wasted, stores the energy as hydraulic potential energy, and then enables discharge of the hydraulic potential energy to the hydraulic hybrid system 100. In the depicted embodiment, the hydraulic hybrid system 100 captures rotational energy and discharges the hydraulic potential energy as auxiliary or supplementary rotational energy. However, this is not meant to be limiting. The hydraulic hybrid system 100 and/or principles discussed with reference to the hydraulic hybrid system 100 may be implemented to capture, store, and discharge energy in other systems such as lifting and/or translating systems.

The hydraulic hybrid system 100 includes an energy source 102 that may be configured to produces a primary kinetic energy, a portion of which is transferred to an output 108. Some examples of the energy source 102 may include a hydraulic pump/motor, a gasoline engine, a diesel engine, a steam engine, an electric motor, a turbine engine, or any other mechanized system that provides, directly or indirectly, kinetic energy to the output 108. In some embodiments, the energy source 102 may include an automotive engine and transmission. The output 108 may include any apparatus that receives the primary kinetic energy of a shaft 104 and performs some function. For example, the output 108 may include a differential of a vehicle.

The energy source 102 is coupled with a hydraulic system generally indicated at 150. The hydraulic system 150 is configured to capture some of the rotational energy of the shaft 104 and store the rotational energy as hydraulic potential energy in an accumulator assembly 126. The accumulator assembly 126 may have a variable storage volume. By varying the storage volume of the accumulator assembly 126, the hydraulic hybrid system 100 may capture a larger range of the energy available at the shaft 104. Additionally, by varying the volume of the accumulator assembly 126, the hydraulic system 150 may efficiently discharge the energy back to the hydraulic hybrid system 100. For instance, when available primary kinetic energy or demand is low, the storage volume of the accumulator assembly 126 may be reduced to meet the specific need. When the available primary kinetic energy or demand is high, the storage volume of the accumulator assembly 126 may be increased to meet the specific need. In some embodiments, the storage volume may depend on operational conditions of the energy source 102, the output 108, a machine including the energy source 102 and the hydraulic system 150, or some combination thereof. For example, the storage volume may be dependent on ground speed, rotational speed of the shaft 104, and the like.

The hydraulic system 150 is further configured to release the hydraulic potential energy and apply an auxiliary or supplementary rotational energy to the shaft 104 under certain operating conditions of the energy source 102 and/or under certain operating conditions the output 108.

Between the energy source 102 and the output 108, the shaft 104 may be coupled to a throughput transmission 106. In some embodiments, a first shaft section 104A is decoupled from a second shaft section 104B and the throughput transmission 106 is installed between the first shaft section 104A and the second shaft section 104B. In these and other embodiments, within the throughput transmission 106, the shaft 104 may continue as a solid shaft. For example, the solid shaft may include one or more universal joints with gearing to transfer rotation of the first shaft section 104A to the second shaft section 104B.

Some embodiments of the throughput transmission 106 may include a close coupling to the energy source 102. In these close coupling embodiments, the throughput transmission 106 is installed directly to the energy source 102, which may eliminate the first shaft section 104A. For example, the energy source 102 may include an engine and transmission of a vehicle. In this example, the throughput transmission 106 may be directly attached to the transmission or otherwise integrated with the transmission or the engine.

The throughput transmission 106 may include a power take off (PTO) 110 configured to selectively couple the shaft 104 to a hydraulic pump/motor (hydraulic motor) 116. The hydraulic motor 116 can be mounted in line with the shaft 104, in tandem with the shaft 104, in parallel with the shaft 104, or in series with the shaft 104 depending on a configuration of the PTO 110 and/or the throughput transmission 106.

Additionally, a clutch 124 or a splined unit (not shown) may selectively couple the shaft 104 to the hydraulic motor 116 via the PTO 110. The clutch 124 can be engaged and disengaged to reduce torque load on the shaft 104 and/or the hydraulic motor 116, for instance. Some examples of the clutch 124 may include a direct face mount clutch or a cylindrical clutch that at least partially encapsulates a rotating group (e.g., some portions of the PTO 110 and some portions of the hydraulic motor 116). In some embodiments, the clutch 124 may be configured to engage when the energy source 102 is stopped and to disengage when the energy source 102 is operating at speed. The clutch 124 (or the splined unit) can be engaged and disengaged pneumatically, hydraulically, electrically, or mechanically. Additionally or alternatively, the clutch 124 (or the splined unit) may be controlled by a controller 112. Some details of the controller 112 are provided elsewhere herein.

For example, when the shaft 104 is rotating and/or the energy source 102 is generally operating at a steady state, the clutch 124 may be disengaged. Thus, the rotation of the shaft 104 is applied to the output 108. However, when a second operator input 122 such as a brake is applied to the energy source 102, the clutch 124 may be engaged, enabling the shaft 104 to transfer rotational energy through the PTO 110 and to the hydraulic motor 116. Likewise, when a first operator input 120 such as an accelerator is applied to the energy source 102, the clutch 124 may mechanically couple the hydraulic motor 116 to the shaft 104 via the PTO 110, which may enable the hydraulic motor 116 to drive the shaft 104 by itself or in combination with the energy source 102.

In some embodiments, the hydraulic hybrid system 100 may omit the PTO 110. In these and other embodiments, the hydraulic motor 116 may be mounted in-line with the shaft 104 or integrated into the shaft 104. A hydraulic motor shaft (not shown) may be splined and another shaft that encompasses the hydraulic motor shaft may be oppositely splined. To drive the hydraulic motor 116, an actuator may slide a portion of the hydraulic motor 116 or the hydraulic motor shaft to engage splines or disengage splines.

The PTO 110, the throughput transmission 106, the hydraulic motor 116, or some combination thereof may be entirely disengaged from the shaft 104, which may enable the energy source 102 to operate apart from the hydraulic system 150. In some embodiments, the shaft 104 may be entirely disengaged from the hydraulic system 150 from a PTO clutch (not shown) configured to disengage the hydraulic motor 116. Enabling the energy source 102 to operate apart from the hydraulic system 150 may be useful during an operational failure of a component of the hydraulic system 150, for example. By entirely disengaging the PTO 110, the through-put transmission 106, the hydraulic motor 116, or some combination thereof, the energy source 102 may continue to operate.

The hydraulic motor 116 may be hydraulically coupled to a valve assembly 200. The valve assembly 200 is hydraulically coupled between a reservoir 118, the hydraulic motor 116, and the accumulator assembly 126. The accumulator assembly 126 and the valve assembly 200 is depicted separate from the reservoir 118. However, this depiction is not meant to be limiting. In some embodiments, the accumulator assembly 126, the valve assembly 200, or some portions thereof may be located within the reservoir 118.

When the shaft 104 is transferring energy to the hydraulic motor 116, the valve assembly 200 is configured such that the hydraulic motor 116 is driving hydraulic fluid from the reservoir 118 to the accumulator assembly 126. The hydraulic fluid builds pressure in the accumulator assembly 126 and accordingly builds hydraulic potential energy. While the accumulator assembly 126 is discharging hydraulic potential energy to the hydraulic motor 116, the valve assembly 200 may be configured such that the hydraulic fluid (or another working fluid) is ported from the accumulator assembly 126 to the hydraulic motor 116, which may cause rotation of the hydraulic motor 116. The rotation of the hydraulic motor 116 may be transferred to the shaft 104 through the PTO 110.

In some embodiments, one or more components of the accumulator assembly 126 may be used as structural members. For example, in embodiments of the hydraulic hybrid system 100 that includes a vehicle, an accumulator included in the accumulator assembly 126 may be incorporated into a vehicle chassis.

The hydraulic motor 116 may include a variable-displacement motor, a constant displacement motor, a gear hydraulic pump, a gerotor pump, a vane pump, a piston pump, or any other suitable pump. Generally, a variable-displacement motor may vary the amount of hydraulic fluid that is moved in one cycle of the hydraulic motor 116. The amount of hydraulic fluid can be controlled remotely or directly. Additionally or alternatively, the amount of the hydraulic fluid can be controlled using a fluid, an electrical signal, or a mechanical actuator. By varying the amount of hydraulic fluid in one cycle of the hydraulic motor 116, a torque applied to the shaft 104 during discharge of the accumulator assembly 126 may be controlled. Thus, in these and other embodiments, a torque applied to the shaft 104 by discharge of the hydraulic potential energy may be controlled at least partially by the hydraulic motor 116.

The hydraulic hybrid system 100 may include the first operator input 120 and the second operator input 122, as discussed above. The first operator input 120 and the second operator input 122 may include, but are not limited to: foot pedals, levers, actuators, another control system providing electrical or mechanical input, etc. The first operator input 120 and the second operator input 122 are not necessarily of a common or similar type and may or may not be operated by a common operator.

The hydraulic hybrid system 100 may also include the controller 112. In some embodiments, the controller 112 includes an electronic controller configured to operate through communication of electrical signals generated at the components and/or sensors monitoring operation of the components. In these and other embodiments, the controller 112 may interface with the energy source 102 via a controller area network (CAN) bus 136, which may enable communication of electrical signals from the components electrically coupled to the CAN bus 136. Additionally, the controller 112 may receive other signals via other communication interfaces, without limitation.

The controller 112 may receive data from one or more discrete feedback devices 138. The discrete feedback devices 138 may be retrofit onto the energy source 102, the shaft 104, the throughtput transmission 106, the output 108, some combination thereof, or some features thereof. The discrete feedback devices 138 may be configured to indicate an operating condition of the hydraulic hybrid system 100. For instance, one or more of the discrete feedback devices 138 may indicate a position of a component (e.g., 120 or 122), a change in position of the component, a rate of change of the component, etc.

The discrete feedback devices 138 may include sensors and instruments mounted to or otherwise monitoring the components in which the discrete feedback devices 138 are included. The controller 112 may adjust one or more settings and/or operational states in the components of the hydraulic hybrid system 100 based on data measured by the discrete feedback devices 138. For example, the controller 112 may receive rotational data from a tachometer monitoring rotational speed of the shaft 104. A volume of an accumulator included in the accumulator assembly 126 may be adjusted based on the received rotational data. Some other examples of the discrete feedback devices 138 may include pressure transducers, displacement sensors, system enable switches, position sensors, global positioning system (GPS) sensors/receivers, speed sensors, other similar sensors, or any combination thereof.

Additionally or alternatively, the discrete feedback devices 138 may include levers, switches, and actuators. The physical action of the levers, switches, and actuators may indicate an operating condition of the energy source 102. For example, a limit switch may be mounted near the first operator input 120. When a user operates the first operator input 120, motion of the first operator input 120 may physically interfere with the limit switch indicating a given position of the first operator input 120. The levers, switches, and actuators may be mechanical, hydraulic, electric, pneumatic, etc.

In some embodiments, the controller 112 may use a standard communication protocol. In these and other embodiments, signals communicated from the discrete feedback devices 138 and/or signals accessed via the CAN bus 136 may be formatted according to the standard communication protocol. For example, the controller 112 may use the J1939 bus protocol. Accordingly, in this and other embodiments, the discrete feedback devices 138 such as the position sensors and/or the speed sensors may generate J1939 messages.

The controller 112 may include a control module 130, memory 132, and a processor 134. The processor 134 may include an arithmetic logic unit (ALU), a microprocessor, a general-purpose controller, or some other processor array to perform computations and software program analysis. The processor 134 may be coupled to a bus for communication with the memory 132 and/or the control module 130. The processor 134 generally processes data signals and may include various computing architectures including a complex instruction set computer (CISC) architecture, a reduced instruction set computer (RISC) architecture, or an architecture implementing a combination of instruction sets.

Although FIG. 1 includes a single processor 134, multiple processors may be included in the controller 112. Other processors, operating systems, and physical configurations may be possible.

The memory 132 may be configured to store instructions and/or data that may be executed by the processor 134. The memory 132 may be coupled to the bus for communication with the other components. The instructions and/or data may include code for performing the techniques or methods described herein. The memory 132 may include a DRAM device, an SRAM device, flash memory, or some other memory device. In some embodiments, the memory 132 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The control module 130 may be configured to enable coordination between one or more components (e.g., 102, 120, 122, 106, 110, 116, 200, and 126) of the hydraulic hybrid system 100. For example, the control module 130 may determine or affect an amount of rotational energy stored as hydraulic potential energy and/or determine or affect an amount of hydraulic potential energy that is discharged into rotational energy. Additionally or alternatively, the control module 130 may be configured to optimize one or more operational parameters of the hydraulic hybrid system 100 based on signals input received via the CAN bus 136 and/or the discrete feedback devices 138.

The control module 130 may be configured to optimize fuel efficiency and/or to optimize torque control of the energy source 102. To optimize fuel consumption and/or torque control, a throttle and the first and/or the second operator inputs 120 and 122 may be calibrated such that introduction of the hydraulic potential energy optimizes fuel use or effective torque transfer to the energy source 102. The controller 112 may determine one or more conditions of the energy source 102 and/or the output 108 during which the hydraulic potential energy stored in the accumulator assembly 126 may be introduced to the shaft 104.

For example, in some embodiments, the energy source 102 may include an engine/transmission (engine) of a vehicle, the output 108 may include rear wheels of the vehicle, the first operator input 120 may be a brake pedal, and the second operator input 122 may be an accelerator pedal. The control module 130 may include a primary throttle subroutine calibrated to the position of the accelerator pedal and hydraulic potential energy stored in the accumulator assembly 126. The position of the accelerator pedal may be controlled and/or monitored via an analog signal or a J1939 CAN Bus signal or another communication protocol.

In the primary throttle subroutine, a throttle signal, which controls fuel management to the engine, may be adjusted to decrease an amount of fuel required to move the vehicle at a rate indicated by a position of the accelerator pedal from 100% to 0% based upon an amount of hydraulic potential energy stored in the accumulator assembly 126. When there is enough hydraulic potential energy to propel the vehicle forward at a desired rate, the throttle signal communicated to the engine is delayed or reduced until the hydraulic potential energy is expended and/or the operator returns the accelerator pedal to a reduced position. When the hydraulic potential energy is expended or there is insufficient hydraulic potential energy to drive the vehicle, the throttle signal is returned to a value based solely on the position of the accelerator pedal. A potential benefit of the primary throttle subroutine may include a reduction in fuel consumption and maximize the use of the engine and hydraulic potential energy.

Additionally, in the example above or similar configuration or application, the control module 130 may include a traction control subroutine. In the traction control subroutine, a first wheel speed sensor monitors front wheel speed and a second wheel speed sensor monitors rear wheel speed. When the front wheel speed differs from the rear wheel speed by more than a predetermined threshold value, a torque applied to rear wheels may be adjusted to reduce slip of the rear wheels. The torque may be adjusted by manipulation of the variable-displacement hydraulic motor 116 or through reducing discharge of hydraulic potential energy from the accumulator assembly 126, for instance. Reducing the torque may ensure proper traction control of the vehicle during cornering and/or acceleration.

Additionally, the control module 130 may include one or more hybrid control programs. The hybrid control programs may be configured to automatically and/or manually adapt performance characteristics of the hydraulic hybrid system 100 according to the application parameter inputs. A first parameter input may adapt controls of the hydraulic hybrid system 100 according to positional signals received from a GPS sensor/receiver, data signals input from the CAN bus 136, other discrete feedback devices 138, or some combination thereof. For example, in an embodiment in which the hydraulic hybrid system 100 includes a vehicle, the control module 130 may receive the positional signals and route information. The positional signals may be compared with fuel efficiency data logged along one or more specific routes. The control module 130 may determine stop densities of the specific routes, which may include how frequently the vehicle stops. The control module 130 may determine a first set of controls for routes having short start/stop densities (e.g., stop signs and/or traffic signals located within two or more blocks) and another set of controls for routes having long start/stop densities (e.g., freeways or highways). As an example, the first set of controls may be configured to capture most of the rotational energy in the accumulator assembly 126 at each stop and discharge the potential hydraulic energy during each acceleration. The second set of controls may be configured to not capture the rotational energy in the accumulator assembly 126, for instance. During use, the control module 130 determines a current route and/or whether the current route has short start/stop densities or long start/stop densities. The control module 130 then implements braking energy stored in the accumulator assembly 126 as well as the discharge of hydraulic potential energy from the accumulator assembly 126 during acceleration according to the sets of controls suitable for the current route and/or the start/stop density.

In this example, the control module 130 determines two sets of controls based on two start/stop densities. In other embodiments, the control module 130 may determine three or more sets of controls based on three or more start/stop densities. Moreover, a single route may include multiple start/stop densities. The control module 130 may accordingly determine multiple sets of controls for the single route and/or determine an average start/stop density of the single route.

A second parameter input may adapt controls of the hydraulic hybrid system 100 based on dynamic statistical modeling during operation of a system implementing the hydraulic hybrid system 100. In embodiments implementing the second parameter input, the control module 130 monitors how the operator is braking and accelerating as well as a frequency of stops. The control module 130 may then make incremental changes to the capture and discharge characteristics of the hydraulic hybrid system 100. For example, the control module 130 may determine if an operator rides the brakes as the vehicle is descending down a hill. In response, the control module 130 may engage the PTO 110 to capture some of the rotational energy as the vehicle descends down hills.

A third parameter input may be implemented in embodiments in which the hydraulic hybrid system 100 is included in a vehicle such as a dump truck or sanitation truck. The third parameter input may adapt controls based on a combination of vehicle weight and a current vehicle speed. The vehicle weight may be ascertained by monitoring tire pressures and/or may be estimated based on arm dump cycles (e.g., a product of a typical weight per bin multiplied by a total number of dump cycles). As the vehicle weight increases or decreases and as the vehicle speed increases or decreases, a total amount of rotational energy stored as hydraulic potential energy as well as the energy discharged may be adapted. For instance, the control module 130 may determine that the vehicle weight has increased and the vehicle is operating at a higher vehicle speed. Accordingly, the control module 130 may increase an amount of energy captured in the accumulator assembly 126 and an amount of energy discharged.

The control module 130 may enable mode selection. In some embodiments, a user interface display 114 may provide a button or other selectable icon that enables an operator to select and/or modify a mode of operation of the hydraulic hybrid system 100. For example, the control module 130 may include three modes. A first mode may include an eco mode. The eco mode may include one or more control settings configured to operate the hydraulic hybrid system 100 in a manner to conserve fuel and limit power. A second mode may include a boost mode. The boost mode may include one or more control settings configured to operate the hydraulic hybrid system 100 in a manner to provide extra power to the output 108, which may boost performance. A third mode may include a standard mode. The standard mode may include one or more control settings configured to operate the hydraulic hybrid system 100 in a manner to provide a combination of performance and fuel savings.

The hydraulic hybrid system 100 may also include the user interface display 114. The user interface display 114 may be communicatively coupled to the controller 112 or one or more other components to receive information pertaining to operations of the hydraulic hybrid system 100. The information may be displayed to an operator on a monitor in some embodiments. For example, the information displayed to the operator may include, but is not limited to, a level of hydraulic fluid in the reservoir 118, when maintenance is recommended may be indicated, charge in the accumulator assembly 126, or the like.

Additionally, in some embodiments, the user interface display 114 may enable an operator to select parameters of the hydraulic hybrid system 100. For example, the operator may disengage or deactivate the hydraulic system 150 in certain circumstances such as longer road trips with limited stops. Additionally, the operator may select one or more modes of operation or another feature of the hydraulic hybrid system 100.

Figure 2:
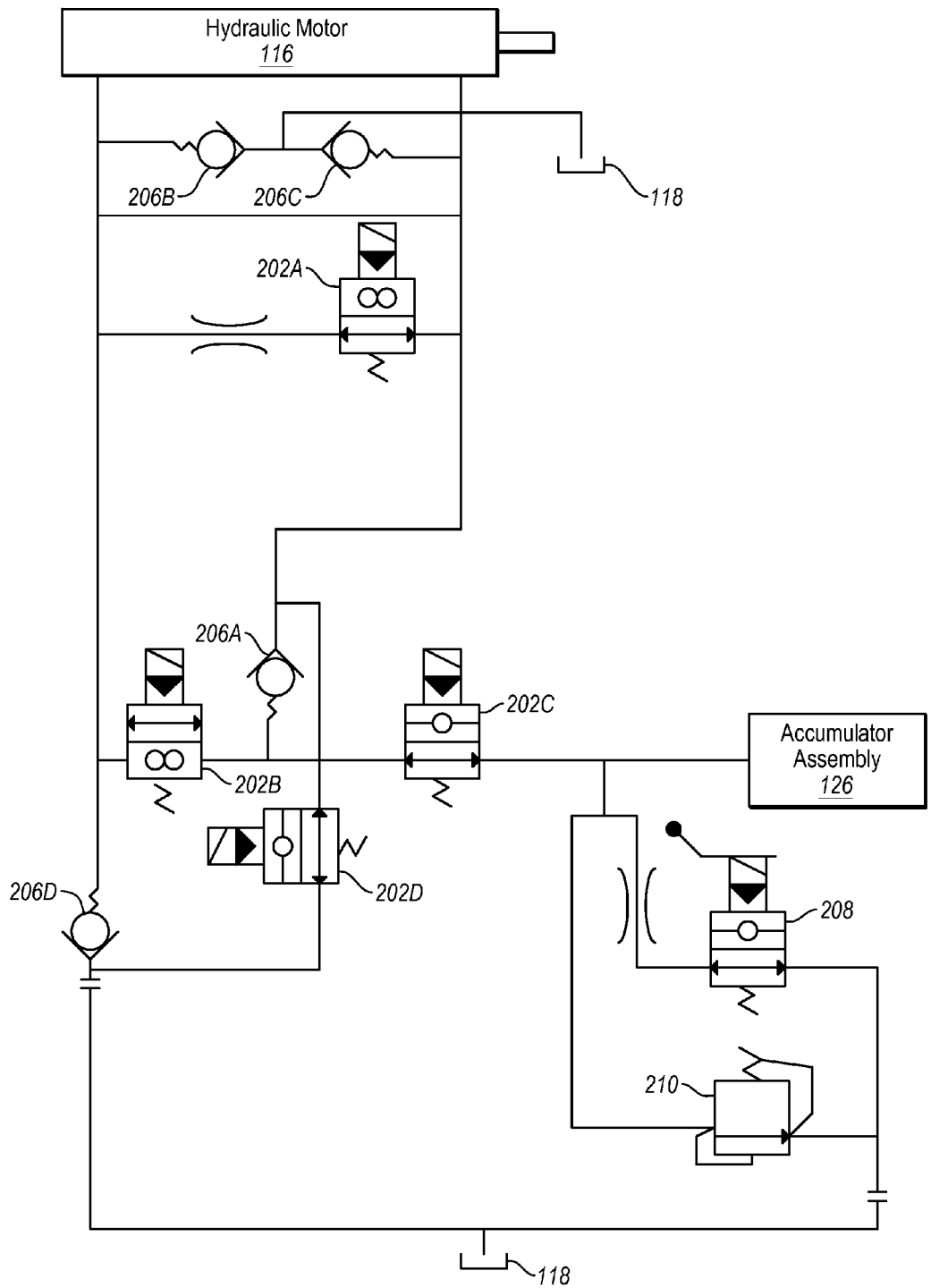
FIG. 2 illustrates a hydraulic schematic of an example valve assembly that may be implemented in the hydraulic hybrid system of FIG. 1.

FIG. 2 illustrates a hydraulic schematic of an example valve assembly 200 that may be implemented in the hydraulic hybrid system 100 of FIG. 1. The hydraulic schematic of FIG. 2 includes some components (116, 118, and 126) described with reference to FIG. 1. Some details of these components are not repeated with reference to FIG. 2.

The valve assembly 200 includes five multi-position valves 202A-202D (generally, valve or valves 202), a manual multi-position valve 208 (manual valve 208), a control valve 210, and four check valves 206A-206D (generally, check valve or check valves 206) in the illustrated embodiment. Each of the valves 202 may allow or disallow flow of hydraulic fluid when "on" and stop the flow of hydraulic fluid when "off." The check valves 206 allow the flow of hydraulic fluid in one direction and not in an opposite direction. The manual valve 208 enables charging and discharging from and to the reservoir 118. The control valve 210 is configured to regulate or control pressures, volumes, transfer rates, etc.

Generally, the valve assembly 200 may include multiple states that correspond to functions of a hydraulic hybrid system such as the hydraulic hybrid system 100 of FIG. 1. In each state, each of the valves 202 is positioned either as "on" or "off." Which of the valves 202 are "on" and which of the valves 202 are "off" determines where hydraulic fluid is routed. Specifically, the states of the valve assembly 200 route hydraulic fluid between the reservoir 118, the hydraulic motor 116, and the accumulator assembly 126.

In some embodiments, the valve assembly 200 may include six states: a float state, a charge state, a drive state, a reverse float state, a reverse charge state, and an idle state. A position table depicted below indicates positions of the valves 202 in each of the states.

|  | Float State | Charge State | Drive State | Reverse Float State | Reverse Charge State | Idle State |
|---|---|---|---|---|---|---|
| 202A | Off | On | On | Off | On | Off |
| 202B | Off | Off | On | On | On | Off |
| 202C | On | On | Off | On | On | On |
| 202D | On | On | Off | On | Off | On |

In the table, the left column includes the valves 202 and the top row indicates the state. For instance, in the charge state, a first valve 202A is on, a second valve 202B is off, a third valve 202C is on, and a fourth valve 202D is on. In alternative embodiments, the valve assembly 200 may include other states and generally another configuration that enables the transfer of hydraulic fluid between the hydraulic motor 116, the reservoir 118, and the accumulator assembly 126.

Figure 3A:
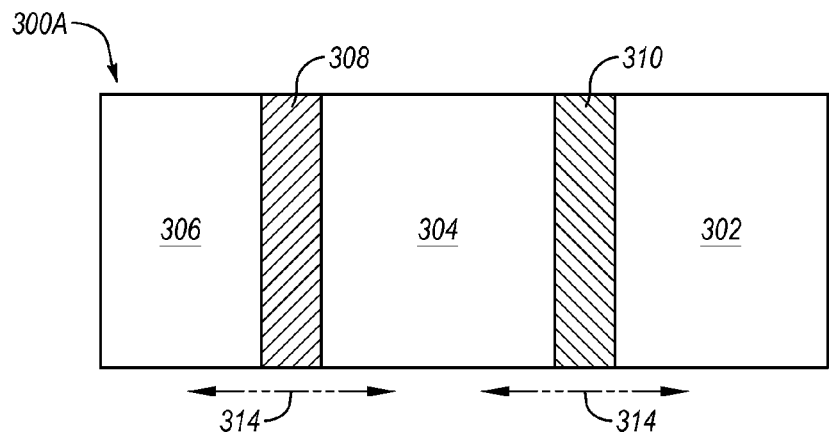
FIGS. 3A and 3B illustrate block diagrams of example variable-volume accumulators that may be implemented in the hydraulic hybrid system of FIG. 1.
Figure 3B:
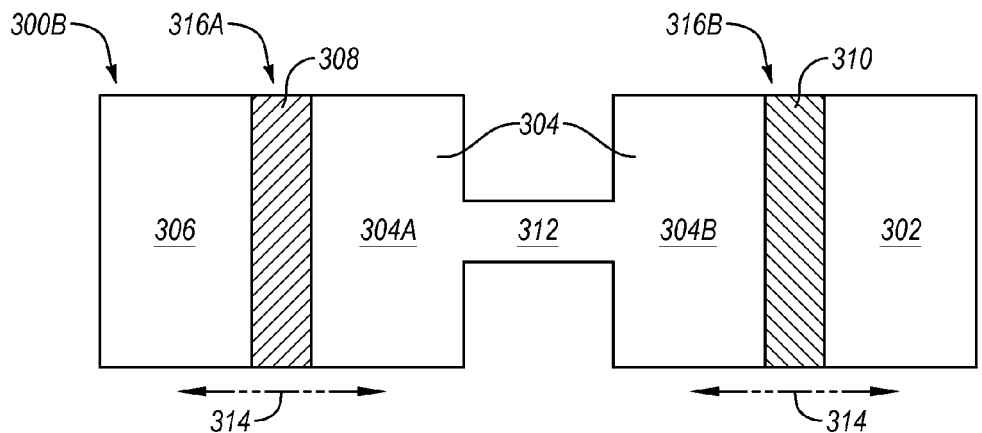

FIGS. 3A and 3B illustrate block diagrams of example variable-volume accumulators 300A and 300B that may be implemented in the hydraulic hybrid system 100 of FIG. 1. Generally, with combined reference to FIGS. 1 and 3A-3B, one or more accumulators may be included in the accumulator assembly 126, which may be used to store hydraulic potential energy resulting from the shaft 104 driving the hydraulic motor 116 via the PTO 110. Specifically, the hydraulic motor 116 may be engaged through the clutch 124 during braking of the energy source 102, for instance. The rotational energy of the shaft 104 may be transferred to the hydraulic motor 116, which may contribute to braking the energy source 102 and/or the output 108. The hydraulic motor 116 may pump hydraulic fluid to the one or more variable-volume accumulators 300A and/or 300B to capture the energy lost during the braking, which is referred to herein as braking energy. The energy source 102 may provide varying amounts of rotational energy to the shaft 104 or varying amounts of rotational energy may be available at the shaft 104. To efficiently store the varying amounts of rotational energy, the accumulator assembly 126 may include the one or more variable-volume accumulators 300A and/or 300B and/or a sequenced accumulator assembly 500 (discussed with reference to FIG. 5).

Referring to FIGS. 3A and 3B, a first variable-volume accumulator 300A and a second variable-volume accumulator 300B are depicted. The first variable-volume accumulator 300A may differ from the second variable-volume accumulator 300B. Specifically, each of the first and the second variable-volume accumulators 300A, 300B includes a second chamber 304. The second chamber 304 in the first variable-volume accumulator 300A is a single volume, while the second chamber 304 in the second variable-volume accumulator 300B may be separated into a first portion 304A and a second portion 304B. A connection 312 may join the first portion 304A to the second portion 304B. Some additional details of the second chamber 304 of the second variable-volume accumulator 300B are provided below.

Other than the second chamber 304, the first variable-volume accumulator 300A and the second variable-volume accumulator 300B are substantially similar. Throughout the following description, the first variable-volume accumulator 300A and the second variable-volume accumulator 300B are referred to together and commonly referred to as variable-volume accumulators 300.

The variable-volume accumulators 300 may include three chambers 302, 304, and 306 that may be separated by piston barriers 308 and 310. A first chamber 302 may be configured to store a working hydraulic fluid. The working hydraulic fluid may include hydraulic fluid that circulates through a system such as the hydraulic system 150 of FIG. 1. The second chamber 304 may be configured to hold a gas. The gas may include atmospheric air, an inert gas such as nitrogen, or another suitable fluid, or any combination thereof. The gas may be pressurized to impose a pre-charge on the first chamber 302. A third chamber 306 may be configured to hold a control fluid. The control fluid may include hydraulic fluid, for instance, and may be the same fluid as the working hydraulic fluid. The control fluid is pumped into or bled from the third chamber 306 to adjust the pre-charge pressure imposed by the second chamber 304 and/or to vary volumes of the first chamber 302 and/or the second chamber 304.

The variable-volume accumulators 300 are depicted as piston/cylinder-type accumulators. It may be appreciated with the benefit of this disclosure that the variable-volume accumulators 300 may include bladder-type accumulators. In embodiments in which the variable-volume accumulators 300 are bladder-type, rather than the piston barriers 308 and 310, the chambers 302, 304, and 306 may include one or more bladders.

The piston barriers 308 and 310 may move as indicated by arrows 314 in FIGS. 3A and 3B. Moving the piston barriers 308 and 310 adjusts the volumes of the chambers 302, 304, and 306, which may adjust a pre-charge pressure imposed on the first chamber 302. Movement of the piston barriers 308 and/or 310 may result from changes in pressures in the chambers 302, 304, and 306 and the piston barriers 310 and 308 may stop movement when pressures across the piston barriers 308 and/or 310 are equalized. Additionally or alternatively, a mechanical force such as a spring force acting on one or more of the piston barriers 308 and 310 may result in movement or a stop to a movement of the piston barriers 308 and 310.

Additionally, the third chamber 306 may have a regulated charge pressure of control fluid supplied to the third chamber 306 to move a second piston barrier 308 toward a first piston barrier 310 when the working fluid in the first chamber 302 is discharged and/or as the working fluid is discharged from the first chamber 302. As a system implementing the variable-volume accumulators 300 is charging fluid into the first chamber 302, the charge pressure on the third chamber 306 may be closed off, which may trap the remaining control fluid. The trapped control fluid may result in reducing a limited amount of stored working hydraulic fluid in the first chamber 302.

Changes in an amount of control fluid in the third chamber 306 may result in changes to volumes of the chambers 302, 304, and 306 as well as changes to a pre-charge pressure imposed on the working hydraulic fluid in the first chamber 302. Filling the third chamber 306 with the control fluid may move the second piston barrier 308 towards the first piston barrier 310, which may reduce the volume of the second chamber 304 and increase the pressure in the second chamber 304. In response, the second piston barrier 308 may move towards the first chamber 302, which may reduce the volume of the first chamber 302. Reducing the volume of the first chamber 302 limits the amount of working hydraulic fluid that may be necessary to obtain a maximum pressure in the first chamber 302. Thus, when lower amounts of energy are available to be captured in the variable-volume accumulators 300, the volume of the first chamber 302 may be reduced such that a smaller amount of working hydraulic fluid is necessary to reach the maximum pressure in the first chamber 302. In addition, the potential hydraulic energy stored in the first chamber 302 may be discharged back to a system because the working hydraulic fluid is at the maximum due to the pre-charge pressure imposed on the first chamber 302 by the first piston barrier 310.

Additionally, as the amount of hydraulic working fluid increases in the first chamber 302, the pressure in the first chamber 302 may increase. Accordingly, the first piston barrier 310 may move towards the first piston barrier 310, increasing the volume of the first chamber 302 and increasing the pressure in the second chamber 304. The increased pressure in the second chamber 304 may move the second piston barrier 308 until the pressure in the second chamber 304 is balanced against a pressure in the third chamber 306. The control fluid in the third chamber 306 may be bled to reduce a volume of the third chamber 306 while maintaining a pressure sufficient to impose the maximum pressure on the working hydraulic fluid. The second piston barrier 308 may move away from the first piston barrier 310 due to the pressure in the second chamber 304. The first chamber 302 may increase in volume, which may allow for storage of more working hydraulic fluid, while maintaining the maximum pressure in the first chamber 302.

By increasing and decreasing the volume of the first chamber 302, the variable-volume accumulators 300 may receive varying amounts of working hydraulic fluid, thus storing varying amounts of hydraulic potential energy. Regardless of amount of working hydraulic fluid, the variable-volume accumulators 300 may maintain a pre-charge pressure imposed against the first chamber 302. Any amount of working hydraulic fluid is usable because the pre-charge pressure is imposed on the working hydraulic fluid by the first piston barrier 310.

In some embodiments, one or more operating conditions of a hydraulic hybrid system (e.g., the hydraulic hybrid system 100) may determine whether to fill or bleed the third chamber 306. For example, the variable-volume accumulators 300 may be implemented in a vehicle. When the vehicle is operating at a slow speed, the volume of the first chamber 302 may be smaller, which may maximize the pressure in the first chamber 302 despite a smaller amount of working hydraulic fluid that is introduced into the first chamber 302. When the vehicle is operating at a high speed, the volume of the first chamber 302 may be larger. The larger volume may enable the variable-volume accumulators 300 to store a larger amount of hydraulic potential energy.

In some embodiments, an actuator may control the amount of the control fluid in the third chamber 306. An actuator position may be adjusted to a given position, which may in turn adjust the volume of the third chamber 306. A closed looped feedback system and/or a controller may control the actuator position. Specifically, speed sensing feedback devices, torque sensing feedback devices, pressure sensing feedback devices, position sensing feedback devices, or some combination thereof may provide feedback signals directly to the closed loop feedback system. The closed loop feedback system directly controls the actuator position based on the feedback signals. Alternatively, the actuator may be controlled by a controller such as the controller 112 of FIG. 1. The speed sensing feedback devices, the torque sensing feedback devices, the pressure feedback devices, the position sensing feedback devices, or some combination thereof may communicate feedback signals to the controller, which in turn provides an output signal to the actuator or the closed loop system that controls the actuator position.

Referring to FIG. 3B, the second variable-volume accumulator 300B may essentially include two accumulators 316A and 316B. The first accumulator 316A includes the third chamber 306 and the first portion 304A. The second accumulator 316B includes the first chamber 302 and the second portion 304B. The first accumulator 316A may act as the pre-charge setting accumulator and the second accumulator 316B may be a standard working accumulator. The gas storage ends of the first and second accumulators 316A and 316B are plumbed together with the connection 312. The connection 312 may include tubing, a hose, or manifolds, for instance.

FIGS. 4A-4D illustrate block diagrams of example third chambers 400A-400D that may be implemented as and/or may include the third chamber 306 in the variable-volume accumulators 300 of FIGS. 3A and 3B. FIGS. 4A-4D additionally illustrate some components (e.g., 304, 306, 308, and 314) already described with reference to FIGS. 3A and 3B. Some details of these components are not repeated with reference to FIGS. 4A-4D. Generally, each of the third chambers 400A-400D may perform the functions described with reference to FIGS. 3A and 3B. For example, each of the third chambers 400A-400D includes a mechanism to vary an amount of control fluid in the third chamber 306 and a mechanism to control movement of the second piston barrier 308.

Figure 4A:
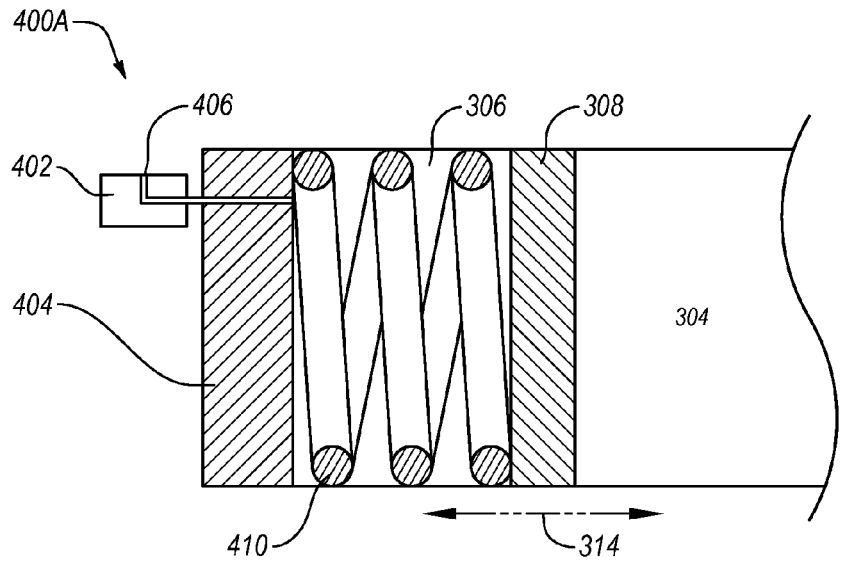
FIGS. 4A-4D illustrate block diagrams of example third chambers that may be implemented in the variable-volume accumulators of FIGS. 3A and 3B.

Referring to FIG. 4A, an internal spring chamber 400A is illustrated. The internal spring chamber 400A is an example of a semi-passive chamber. The internal spring chamber 400A includes a spring 410 that may be located in the third chamber 306. The spring 410 imposes a mechanical force against the second piston barrier 308, biasing a first chamber (302 in FIGS. 3A and 3B) to a minimum volume. A magnitude of the mechanical force may be controlled through selection of the spring 410 with a specific spring constant, etc. The mechanical force may at least partially set and/or maintain the maximum pre-charge pressure in the second chamber 304.

A valve body 404 may make up a boundary of the third chamber 306 opposite the second piston barrier 308. Alternatively, the valve body 404 may be positioned relative to the boundary of the third chamber 306 opposite the second piston barrier 308. Attached to the valve body 404 may be a filling valve 402. In addition, included in the valve body 404 may be a port 406, which may be routed through the filling valve 402. When filling the third chamber 306, control fluid may move through the filling valve 402. When a specific pre-charge pressure is reached in the second chamber 304 and/or the first chamber is adjusted to a specific volume, the filling valve 402 is shut, which may trap the control fluid in the third chamber 306.

As working hydraulic fluid is routed to the first chamber, the second chamber 304 may move on the second piston barrier 308 towards the valve body 404. To allow expansion of the first chamber and while maintaining a maximum pressure, the control fluid may be bled from the third chamber 306 through the port 406. When a specific pre-charge pressure is reached and/or the first chamber is adjusted to a specific volume, the port may be shut, which may trap the control fluid in the third chamber 306.

In some embodiments, bleeding of control fluid from the third chamber 306 through the port 406 may be done through a relief valve (not shown). Additionally, the port 406 may be substantially routed through the filling valve 402 that may include the relief valve. Use of the relief valve may enable the variable-volume accumulators to charge at a constant pressure in chambers 306, 304, and 302 through a range of volumes being charged in the first chamber.

Figure 4B:
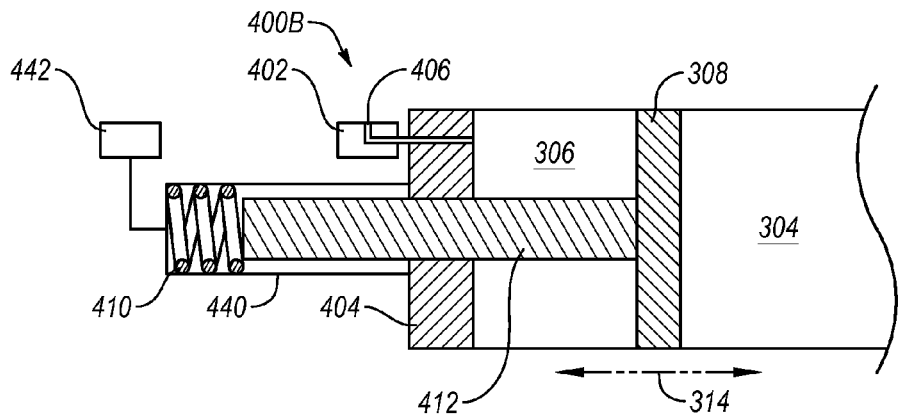

FIG. 4B illustrates an example spring-piston chamber 400B. The spring-piston chamber 400B is another example of a semi-passive chamber. The spring-piston chamber 400B includes the spring 410, the filling valve 402, and the port 406 which operate similarly to the spring 410, the filling valve 402, and the port 406 in the internal spring chamber 400A of FIG. 4A. However, in the spring-piston chamber 400B, the second piston barrier 308 is attached to a piston rod 412. In the spring-piston chamber 400B, the spring 410 is located between an end of the piston rod 412 and a rod housing 440. The rod housing 440 may include a vent that may be configured to vent the volume in which the spring 410 is located.

In the spring-piston chamber 400B, the spring 410 imposes a mechanical force against the piston rod 412 that moves the second piston barrier 308 and may bias a first chamber in a minimum volume. A magnitude of the mechanical force may be controlled through selection of the spring 410 with a specific spring constant, etc. The mechanical force may at least partially set and/or maintain the maximum pre-charge pressure in the second chamber 304.

The valve body 404 along with a rod housing 442 may make up a boundary opposite the second piston barrier 308. The valve body 404 may be sealed against the piston rod 412 to keep the control fluid away from the spring 410.

Figure 4C:
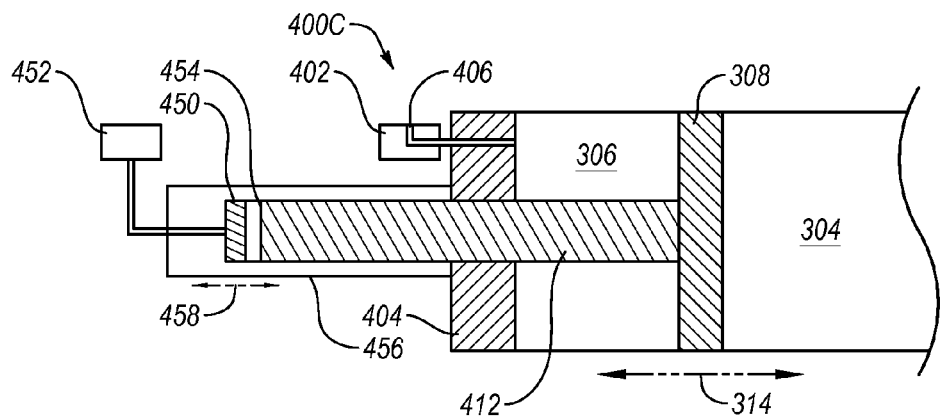

FIG. 4C illustrates a hydraulic ram chamber 400C. The hydraulic ram chamber 400C is an example of an active chamber. The hydraulic ram chamber 400C includes the filling valve 402 and the port 406 which operate similarly to the filling valve 402 and the port 406 of the internal spring chamber 400A and the spring-piston chamber 400B. Additionally, in the hydraulic ram chamber 400C, the second piston barrier 308 is attached to the piston rod 412.

In the hydraulic ram chamber 400C, a hydraulic ram 450 is positioned behind the piston rod 412. A ram actuation mechanism 452 may move the hydraulic ram 450 towards an end 454 of the piston rod 412. An example of the ram actuation mechanism 452 may include an electric pneumatic hydraulic ram. The movement of the hydraulic ram 450 is represented in FIG. 4C by arrow 458. When the hydraulic ram 450 moves, the second piston barrier 308 may also move. A ram housing 456 may house the piston rod 412 and/or seal the hydraulic ram 450 to the valve body 404.

In the hydraulic ram chamber 400C, the hydraulic ram 450 imposes a mechanical force against the piston rod 412 that may move the second piston barrier 308. The movement of the hydraulic ram 450 may force the second piston barrier 308 against the second chamber 304, which may provide some additional functions to a system implementing the hydraulic ram chamber 400C. For example, a maximum pressure with a controlled volume in a first chamber (302 in FIGS. 3A and 3B) may be maintained. Rather than adjusting the volume in the first chamber, the working hydraulic fluid above a predefined amount may be vented from the first chamber, which may act like a compression brake.

Figure 4D:
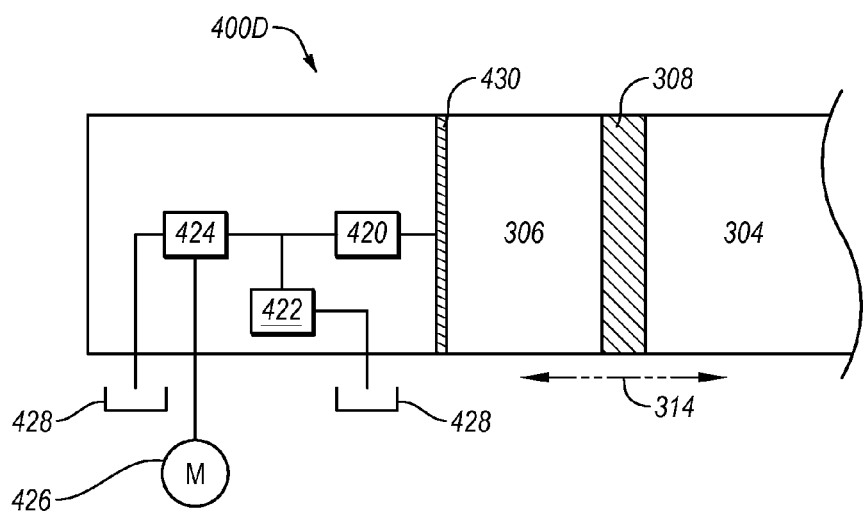

FIG. 4D illustrates a hydraulic pump chamber 400D. The hydraulic pump chamber 400D is another example of an active chamber. The hydraulic pump chamber 400D includes a motor 426 that drives an integrated hydraulic pump 424. The integrated hydraulic pump 424 moves fluid through a regulating valve 420, through a chamber boundary 430, and into the third chamber 306. The hydraulic pump chamber 400D also includes a relief valve 422 that may prevent overpressure of the third chamber 306 and/or prevent damage to the regulating valve 420 if the motor 426 is running when the regulating valve 420 is shut. The relief valve 422 may dump the fluid to a reservoir 428. The integrated hydraulic pump 424 may also draw from the reservoir 428.

As discussed above, by pumping the control fluid into the third chamber 306 the volume of a first chamber (302 of FIGS. 3A and 3B) may be adjusted. Additionally, the integrated hydraulic pump 424 may force the second piston barrier 308 against the second chamber 304, which may provide some additional functions to a system implementing the hydraulic pump chamber 400D. For example, a maximum pressure with a controlled volume in the first chamber may be maintained. Rather than adjusting the volume in the first chamber, the working hydraulic fluid above a predefined amount may be vented from the first chamber, which may act like a compression brake.

Figure 5:
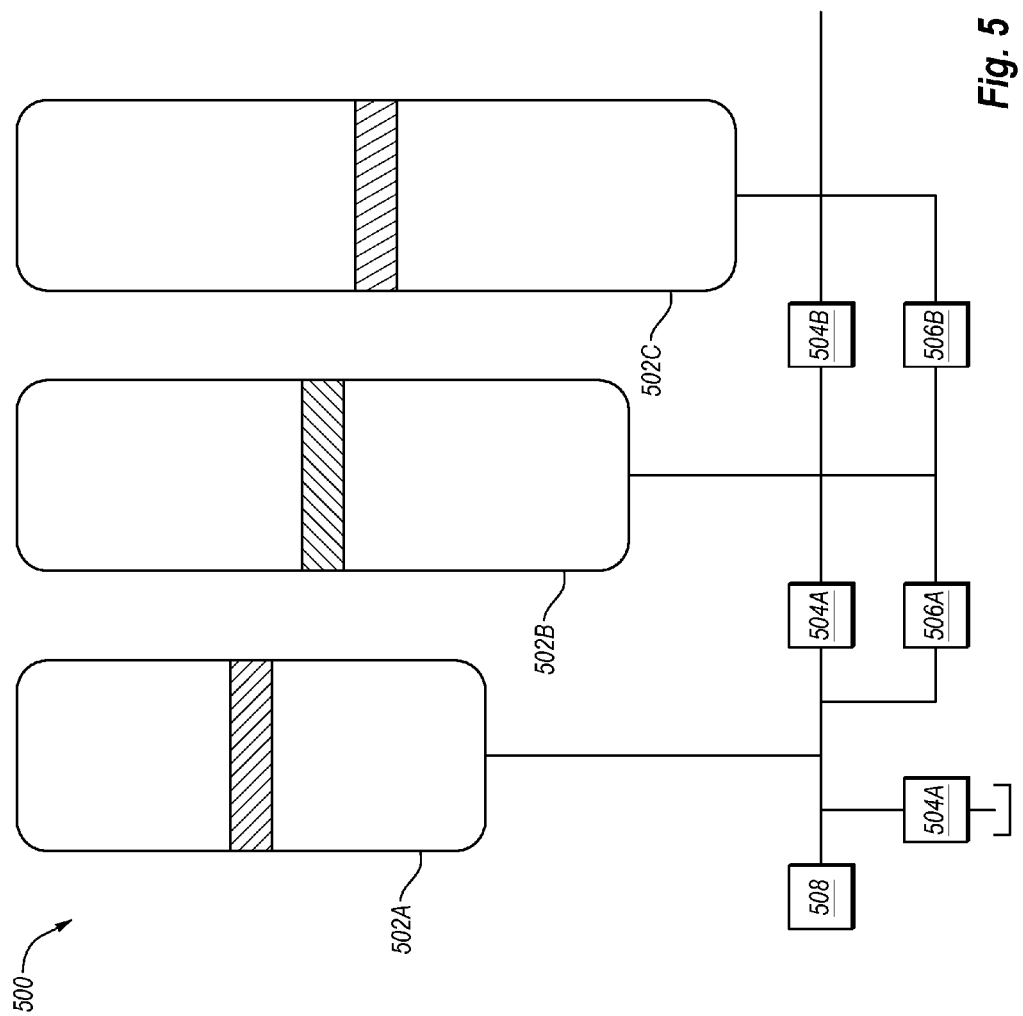
FIG. 5 illustrates a block diagram of an example sequenced accumulator assembly that may be implemented in the hydraulic hybrid system of FIG. 1.

FIG. 5 illustrates a block diagram of an example sequenced accumulator assembly 500 that may be implemented in the hydraulic hybrid system 100 of FIG. 1. Specifically, the sequenced accumulator assembly 500 may be implemented in the accumulator assembly 126 of FIG. 1. The sequenced accumulator assembly 500 may provide one or more of the functions of the variable-volume accumulators 300 discussed with reference to FIGS. 3A-4D. For example, the sequenced accumulator assembly 500 includes accumulators 502A-502C (generally, accumulator 502 or accumulators 502) configured to store varying amounts of potential hydraulic energy, or more generally the sequenced accumulator assembly 500 may include two or more accumulators 502. However, rather than adjusting the volume of a chamber as in the variable-volume accumulators 300, the sequenced accumulator assembly 500 varies volume and/or pressure by introducing and removing the accumulators 502 from operation in the sequenced accumulator assembly 500. For example, in the sequenced accumulator assembly 500, the accumulators 502 may be individually hydraulically isolated and hydraulically coupled. In the sequenced accumulator assembly 500, the accumulators 502 may be connected in a serial configuration or in a parallel configuration. Additionally or alternatively, one or more of the accumulators 502 may have different or the same volumes.

In FIG. 5, the accumulators 502 are configured in a series configuration and the accumulators 502 have different volumes. However, this depiction is not meant to be limiting, the accumulators 502 in FIG. 5 may have the same volume, may be configured in parallel, or may act in parallel. The accumulators 502 may be separated by valves 504A and 504B with secondary valves 506A and 506B configured in parallel to the valves 504A and 504B. Operation of the valves 504A and 504B and the secondary valves 506A and 506B may introduce and remove one or more of the accumulators 502 to a system 508. The valves 504A and 504B and the secondary valves 506A and 506B may be controlled by operating conditions of the system 508, feedback from the system 508, conditions in the accumulators 502, or some combination thereof.

In some embodiments, the valves 504A and 504B may be sequencing valves and the secondary valves may be check valves. In some alternative embodiments, one or more of the valves 504A and 504B and/or one or more of the secondary valves 506A and 506B may include directional valves, counterbalance valves, shuttle valves, orifices, or relief valves. Alternatively, the secondary valves 506A and 506B may be omitted.

The accumulators 502 may be charged in a charge sequence and/or discharged in a discharge sequence (collectively, sequence or sequences). The sequence may be controlled by the valves 504A and 504B (as in FIG. 5). For example, a first accumulator 502A may be charged, then if optimal under the operating conditions, a second accumulator 502B may be charged, etc. By including the second accumulator 502B, the storage volume increases. Accordingly, to include the second accumulator 502B the operating conditions may be sufficient to fill the first accumulator 502A and at least partially fill the second accumulator 502B. The first accumulator 502A may be discharged. When pressure is reduced and the equilibrium between the first and the second accumulators 502A and 502B is reached, both accumulators 502 may discharge simultaneously, etc. In some embodiments, the first accumulator 502A is discharged to the pressure in the second accumulator 502B. The first accumulator 502A and the second accumulator 502B are then discharged together. Again, to include the first accumulator 502A, the operating conditions may be sufficient to warrant discharge of the potential energy stored in the first and second accumulators 502A and 502B. Sequentially charging and discharging the accumulators 502 may maximize power density of the energy stored in the accumulators 502, which may optimize regenerative properties of the sequenced accumulator assembly 500.

The accumulators 502 may be sized according to one or more characteristics of a system implementing the sequenced accumulator assembly 500. Specifically, with combined reference to FIGS. 1 and 5, in the hydraulic hybrid system 100, the accumulators 502 may be sized according to a total displacement of the hydraulic motor 116. Alternatively, the accumulators 502 may be sized according to a capacity of the hydraulic system 150. Alternatively, the accumulators 502 may be sized in relation to a particular revolution per min (RPM) rating and a drive ratio necessary to achieve a maximum pressure of the hydraulic system 150, but allowing maximum torque available at various increasing RPMs. Alternatively still, the accumulators 502 may be sized according to one or more of the factors listed above.

For example, the first accumulator 502A may be sized to achieve maximum charge at a first RPM. The second accumulator 502B may be sized so that a combined volume of the first accumulator 502A and the second accumulator 502B is about equal to a maximum charge at a second RPM, which is greater than the first RPM.

In some embodiments, two or more of the accumulators 502 may be connected through a common head or an integrated manifold. Integration of the two or more accumulators 502 connected through the common head or the integrated manifold may provide improved controls of pressures and volumes in the accumulators 502 over accumulators not connected through the common head or the integrated manifold. Additionally, the two or more of the accumulators 502 connected through the common head may reduce plumbing in a hydraulic system including the accumulators 502 connected through the common head. The two or more of the accumulators 502 connected through the common head may also reduce packaging requirements and reduce the amount of fittings and hoses used to plumb the accumulators 502.

The variable-volume accumulators 300 discussed with reference to FIGS. 3A-4D and the sequenced accumulator assembly 500 discussed with reference to FIG. 5 may be implemented in the hydraulic hybrid system 100 discussed in FIG. 1. For example, when applying a brake to the energy source 102, the hydraulic motor 116 may be engaged such that the shaft 104 drives the hydraulic motor 116, which further pumps hydraulic fluid into the variable-volume accumulators 300 and/or the sequenced accumulator assembly 500. Additionally, the variable-volume accumulators 300 and/or the sequenced accumulator assembly 500 may discharge the hydraulic fluid to the hydraulic motor 116, which drives the shaft 104, which may result in efficient fuel usage of the energy source 102.

The variable-volume accumulators 300 and the sequenced accumulator assembly 500 are not limited to the hydraulic hybrid system 100 of FIG. 1 or to similar, rotational systems. The variable-volume accumulators 300 and the sequenced accumulator assembly 500 may be implemented in any hydraulic system including, but not limited to, regenerative systems.

Additionally, the variable-volume accumulators 300 and the sequenced accumulator assembly 500 may be implemented together as a hydraulic assist and/or a vehicle regenerative drive system in some embodiments. The hydraulic hybrid system 100 may be installed in applications having a primary hydraulic system and/or a vehicle drive system. The hydraulic hybrid system 100 may assist the primary hydraulic system and/or the vehicle drive system. For example, the hydraulic hybrid system 100 may be installed in a sanitary truck application. The hydraulic hybrid system 100 may assist the lifting primary hydraulics as well as the vehicle rotational system. This diversion of energy may reduce work of an engine and work of the lifting primary hydraulic pumps, which may reduce overall fuel consumption.

Figure 6A:
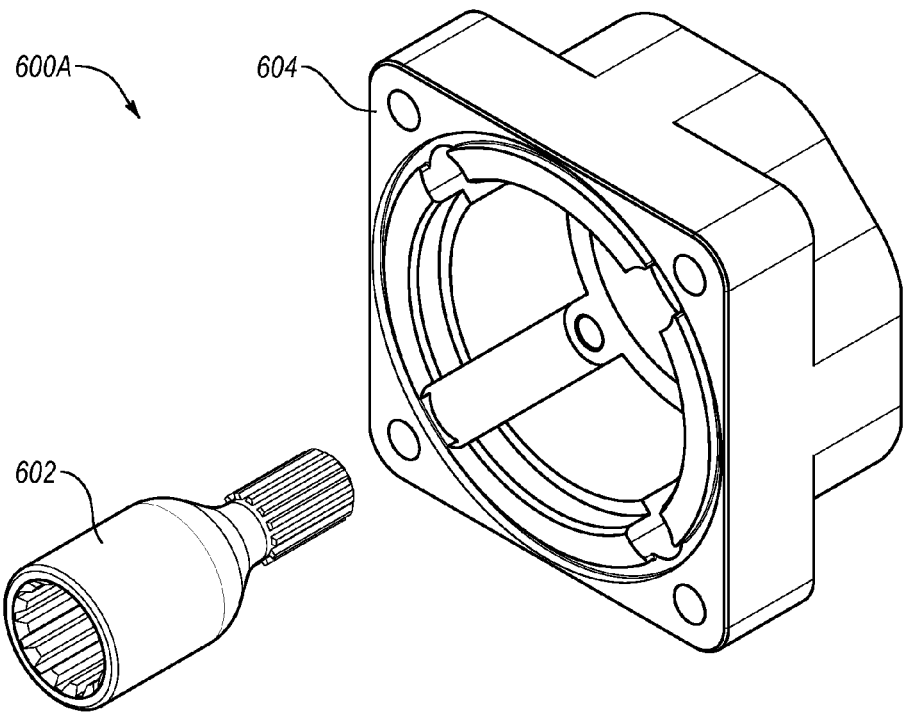
FIGS. 6A and 6B illustrate example adaptor assemblies that may be implemented in the hydraulic hybrid system of FIG. 1.
Figure 6B:
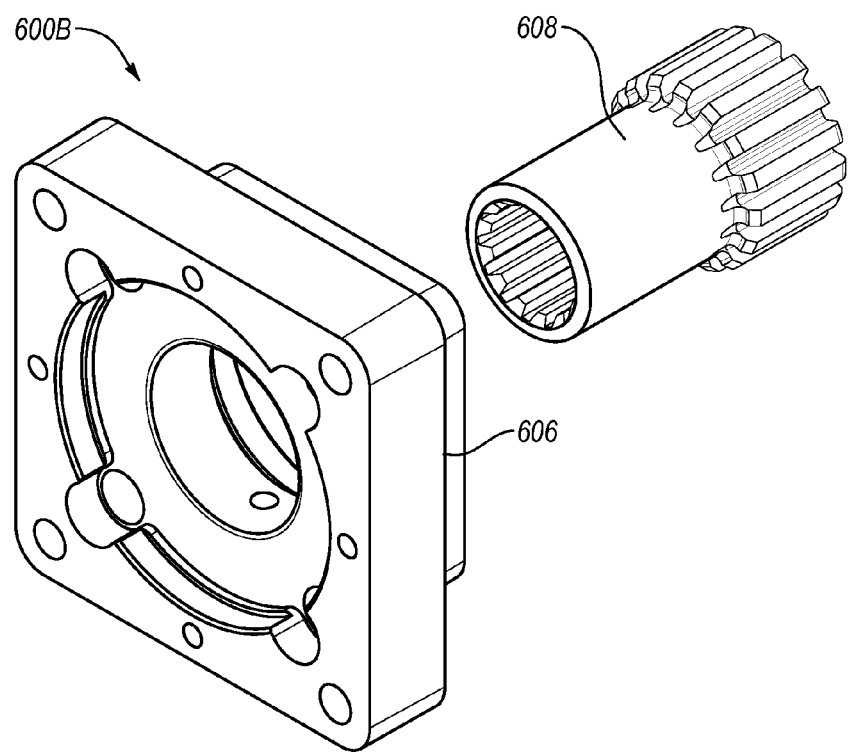

FIGS. 6A and 6B illustrate some example adaptor assemblies 600A and 600B that may be implemented in the hydraulic hybrid system 100 of FIG. 1. The adaptor assemblies 600A and 600B may be implemented to mount dissimilar flanges and shafts. For example, in embodiments in which a hydraulic motor flange does not match a PTO pad flange, an adapter assembly such as the adaptor assemblies 600A and 600B may be used.

The adaptor assemblies 600A and 600B depict two non-limiting examples of adaptor assemblies that may be implemented in hydraulic hybrid systems. A first adaptor assembly 600A may include a society for automotive engineers (SAE) D to SAE C shaft adapter 602 and an SAE D to SAE C flange adaptor 604. The shaft adapter 602 may be machined such that the shaft adapter 602 may receive the SAE D shaft, and then be inserted into the flange adaptor 604. A second adaptor assembly 600B may include an SAE C to SAE D flange adaptor 606 with an SAE D to clutch driver gear 608. In the second adaptor assembly 600B, the clutch driver gear 608 may be removed from the PTO and re-machined to receive an SAE C shaft.

The first and the second adaptor assemblies 600A and 600B may include one or more O-ring grooves. The O-ring groves may be configured to retain lubricating oil within the PTO and/or enable lubricating oil to be supplied to one or more of the components (602, 604, 606, and 608). In some embodiments, a supply line may be plumbed to a side of the flange adapters 604 or 606 that supplies the lubricating oil to the adaptor assemblies 600A and 600B.

The depicted adaptor assemblies 600A and 600B may be implemented in embodiments in which a SAE C-mount flange exists on a PTO and a SAE D-mount motor is coupled to the PTO. Other embodiments may include SAE D to SAE C, SAE C to SAE D, SAE B to SAE C, SAE C to SAE B, SAE D to SAE E, SAE E to SAE D, SAE A to SAE B, or SAE B to SAE A. Other embodiments can include international organization for standardization (ISO) adapters of various sizes as well.

Figure 7A:
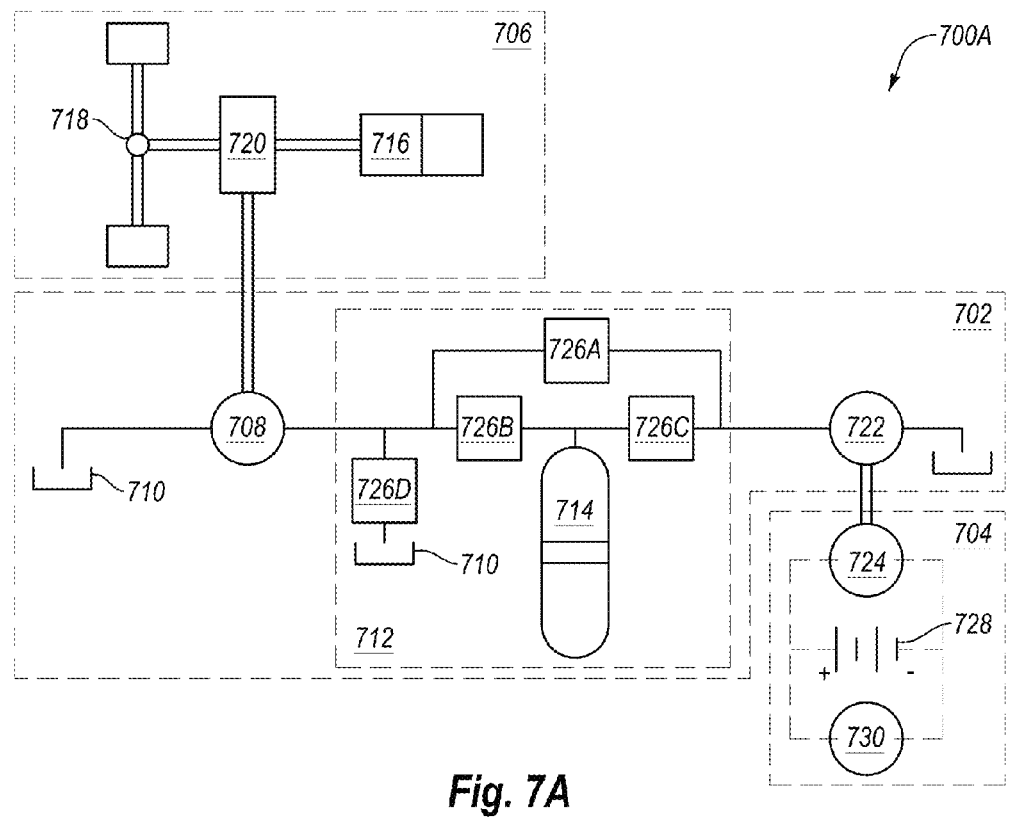
FIGS. 7A and 7B illustrate block diagrams of example embodiments of hydraulic hybrid systems.
Figure 7B:
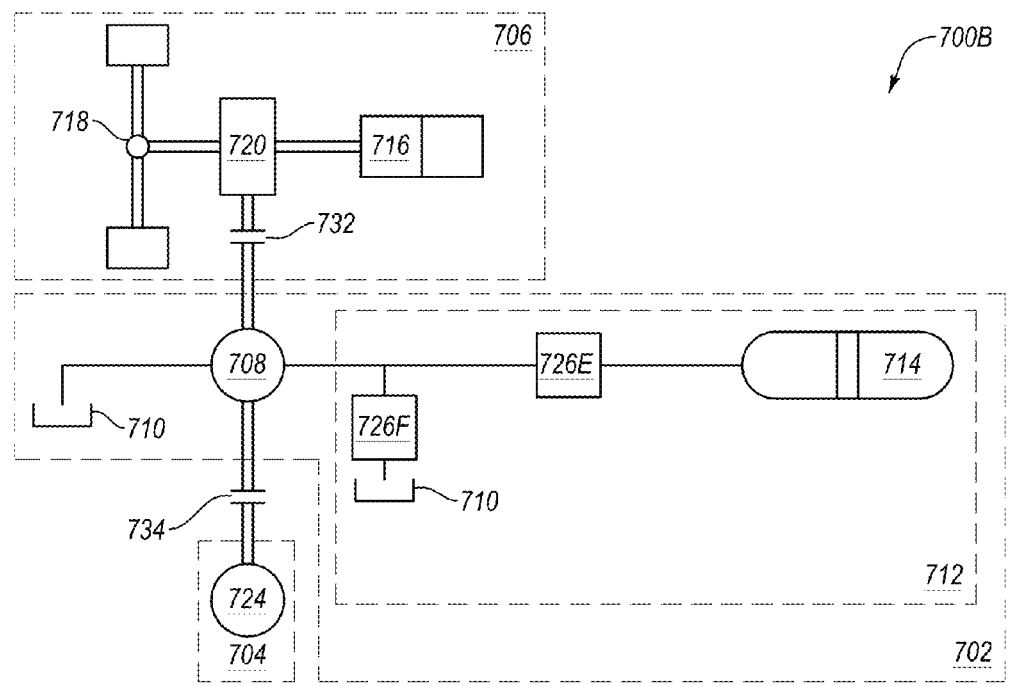

FIGS. 7A and 7B illustrate block diagrams of example embodiments of hydraulic hybrid systems 700A-700C (generally, hydraulic hybrid system 700 or hydraulic hybrid systems 700). The hydraulic hybrid systems 700 may be configured to operate similarly to the hydraulic hybrid system 100 of FIG. 1. Each of the hydraulic hybrid systems 700 include a configuration in which a primary system 706 is coupled to a hydraulic system 702 which is further coupled to an accessory 724. Kinetic energy produced in the primary system 706, or some portion thereof, is transferred to the accessory 724 via the hydraulic system 702. In some embodiments, the accessory 724 includes a subsystem of an energy source 716 of the primary system 706. In some embodiments, the accessory 724 may include an ancillary system that may perform a function other than the function of the primary system.

In the embodiments discussed with reference to FIG. 1, the hydraulic system 150 is configured to recapture hydraulic potential energy stored in the accumulator assembly 126. The hydraulic potential energy drives the hydraulic motor 116 which in turn drives the output 108 via the PTO 110 and the throughput transmission 106. In the embodiments discussed with reference to FIGS. 7A and 7B, the hydraulic potential energy is discharged to the accessory 724. The embodiments of FIGS. 7A and 7B may also discharge the hydraulic potential energy to the primary system 706 as discussed with reference to FIG. 1.

With reference to FIGS. 7A and 7B, the primary system 706 includes the energy source 716, a transmission 720, and an output 718. The energy source 716 is configured to produce the kinetic energy. In the depicted embodiment, the energy source 716 may include an engine/transmission or a motor assembly of a vehicle configured to produce rotational kinetic energy, for instance. The output 718 is configured to receive at least a portion of the kinetic energy produced by the energy source 716. In the depicted embodiment, the output may include a differential of a vehicle, for instance.

The transmission 720 is coupled between the energy source 716 and the output 718. The transmission 720 is configured to mechanically drive a primary hydraulic pump/motor (primary motor) 708. The transmission 720 may mechanically drive the primary motor 708 using a portion of the kinetic energy produced by the energy source 716. The kinetic energy may be divided in any allocation between the output 718 and the primary motor 708. For example, in some circumstances, all of the kinetic energy produced by the energy source 716 may be used to drive the primary motor 708. In other circumstances, none of the kinetic energy produced by the energy source 716 is used to drive the primary motor 708.

In FIGS. 7A and 7B, the hydraulic system 702 includes the primary motor 708. The primary motor 708 is hydraulically coupled to a reservoir 710 and an accumulator assembly 712. The primary motor 708 is configured to charge an accumulator 714 of the accumulator assembly 712 with a working fluid when mechanically driven via the transmission 720.

Referring to FIG. 7A, a first hydraulic hybrid system 700A is depicted. The hydraulic system 702 includes an auxiliary hydraulic pump/motor (auxiliary motor) 722 coupled to the accessory 724 and one or more control valves 726A-726D.

The auxiliary motor 722 is positioned to receive the working fluid from the accumulator 714 and the primary motor 708. The primary motor 708, the accumulator 714, and the control valves 726A-726D are configured such that the working fluid provided to the auxiliary motor 722 results in substantially consistent operation of the accessory 724.

For example, the primary motor 708 may capture energy from the primary system 706 and rapidly charges the accumulator 714. The working fluid is controlled through the control valves 726A-726D that control the fluid through pressure control, directional control, and/or flow control. The working fluid stored in the accumulator 714 may then be used to hydraulically drive the auxiliary motor 722, which in turn operates the accessory 724.

In the depicted embodiment, the accessory 724 includes a generator coupled to a battery 728 and a motor 730. The speed at which the generator operates can be precisely controlled. Controlling the speed at which the generator operates may allow optimal charging characteristics to the battery 728.

Additionally, auxiliary motor 722 may be configured to drive the generator to supply electrical loads. For example, if the battery 728 is fully charged or the primary system 706 has a high demand (e.g., the motor 730 is turned on) and there is available working fluid in the accumulator 714, then the working fluid can be sent to the motor 730 which in turn drives the generator, which may meet power demand and reduce or eliminate loads on the battery 728.

For example, the first hydraulic hybrid system 700A may be implemented in an electric hybrid vehicle (e.g., an electric-hydraulic or an electric/fossil fuel/hydraulic hybrid). The transmission 720 may drive the primary motor 708 when a hydraulic driveline braking is applied through the transmission 720. The braking energy is stored in the accumulator 714 as a pressurized working fluid, which may be compressed against a compressible gas, for example. The accumulator 714 may capture a significant portion of the braking energy. The braking energy stored in the accumulator 714 may then be metered via to the auxiliary motor 722 that is coupled to the generator. The auxiliary motor 722 spins the generator 724 at an optimal speed for charging the battery 728.

The battery 728 may be coupled to the motor 730. The motor 730 may be used as or in conjunction with the energy source 716. Accordingly, the braking energy may be captured and used to charge the battery 728. The controllable storage and dissipation of the braking energy may reduce heat generated in the battery 728 and may act as a mechanical capacitor. Additionally, the controllable storage and dissipation of the braking energy may increase the cycle life of the battery 728 as well as reduce dynamic capacitance that may be present in an electrical system 704.

In FIG. 7A, the primary motor 708 is directly driven by the transmission 720. In these and other embodiments, engagement of the primary motor 708 may be controlled through operation of the transmission 720. Additionally or alternatively, operation of the primary motor 708 and/or the hydraulic system 702 may be controlled through operation of the control valves 726A-726D, which may be controlled by a controller such as the controller 112.

Referring to FIG. 7B, a second hydraulic hybrid system 700B is depicted. The second hydraulic hybrid system 700B may be substantially similar to the first hybrid system 700A of FIG. 7A. However, the second hydraulic hybrid system 700B may omit the auxiliary motor 722. Instead, in the second hydraulic hybrid system 700B, the accessory 724 may be selectively coupled to the primary motor 708 via a first clutch 734. Additionally, the primary motor 708 may be selectively coupled to the transmission 720 via a second clutch 732.

The function of the second hydraulic hybrid system 700B is substantially similar to the function of the first hydraulic hybrid system 700B except valves 726E and 726F, the first and second clutches 732 and 734, and the accumulator 714 are configured to determine operation of the primary pump 708 and/or the accessory 724. For example, in some embodiments, the valves 726E and 726F, the first and second clutches 732 and 734, and the accumulator 714 may be configured to maintain the accessory 724 at a substantially consistent operation. As described above, the substantially consistent operation may include rotating a generator an optimal rate to charge a battery, for instance.

The embodiment depicted in 7B includes the accessory 724 not coupled to a battery or the motor 730. In non-illustrated embodiments, the second hydraulic hybrid system 700B and/or the first hydraulic hybrid system 700A may be coupled to any type of accessory 724. Some example accessories 724 may include generators, hydraulic pumps, air compressors, PTOs including mechanical connections and electrical connections, and mechanical PTOs, without limitation.

Referring to FIGS. 7A and 7B, one or more of the valves 726E, 726B, and 726C may include a modulating backpressure valve. The modulating backpressure valve can be mounted in series with the primary motor 708 and/or the auxiliary motor 722. The modulating backpressure valve may create a substantially constant rate of hydraulic pressure, which may result in a constant rate of input torque to the primary motor 708, the auxiliary motor 722, and the accessory 724. The modulating backpressure valve can be mechanically adjustable, hydraulic proportional, or electric proportional, for example. Adjustment levels can be determined by inputs from discrete feedback devices (e.g., discrete feedback devices 138 of FIG. 1) such as pressure transducer/switches, encoders, Doppler sensors, and the like.

The transmission 720 is depicted in FIGS. 7A and 7B as being separate from the energy source 716 and the output 718. In some embodiments, the transmission 720 may be included in or integrated into the energy source 716 or the output 718. For instance, in embodiments in which the primary system 718 includes a trailer or a vehicle such as a sanitary truck, ambulance, fire truck, and the like, the hydraulic hybrid system 700 may include a differential-mounted hydraulic pump/motor. The differential-mounted hydraulic pump/motor may be configured to be driven by a pinion gear (e.g., a spiral bevel pinion gear or a hypoid pinion gear) off one or more of the differential gears. In other example embodiments a hydraulic pump/motor can be integrated into a differential and driven by the rack gear ring. In these and other embodiments, when a vehicle is moving, the ring gear ring is driving the pinion gear which rotates the hydraulic pump/motor.

Embodiments in which the hydraulic pump/motor is integrated into the differential may operate similarly to the embodiments described elsewhere herein. For example, when the vehicle is braking, a working fluid may be directed to an accumulator, directly or through a series of valves. As resistance to flow occurs, a back pressure on the pump/motor causes resistance on the rack gear ring. The back pressure may bring or assist in bringing the vehicle to a stop with or without assistance from the existing vehicle braking system. The pressurized working fluid can then be used to assist in providing traction to the vehicle. As in the embodiments described elsewhere herein, valving between the hydraulic pump/motor and the accumulator can also create back pressure used to slow or stop the vehicle. Additionally, torque input to the gears in the differential can be controlled based on load demand or at a constant rate, which may reduce or prevent wheel lock and wheel skids.

Additionally or alternatively, the transmission 720 may be integrated into the energy source 716. An example of an embodiment in which the transmission 720 is integrated into an energy source is described with reference to FIG. 9.

FIGS. 8A-8E illustrate block diagrams of example embodiments of compressible fuel tank backpressure regulators 800A-800E (generally, regulator 800 or regulators 800). In the regulators 800, a first chamber 802 of an accumulator 804 may be configured to receive a compressible fuel such as compressible natural gas (CNG). The accumulator 804 may be a fuel tank that provides the compressible fuel to an energy source 810 or may be coupled to a pressurized fuel tank.

The accumulator 804 includes the first chamber 802 and a second chamber 806 which are separated by a barrier 808. The second chamber 806 is configured to have a variable amount of a working fluid that is regulated and/or provided by supply systems 812A-812E. Increasing the amount of working fluid moves the barrier 808 to decrease a volume of the first chamber 802. For example, as compressible fuel is used, the working fluid may be added to the second chamber 806 to decrease the volume of the first volume. Decreasing the volume of the first chamber 802 may reduce a pressure decay of the compressible fuel as the compressible fuel is consumed and/or to maintain a substantially constant pressure in the first chamber 802. In embodiments such as vehicles in which the regulators 800 are implemented, providing a fuel system with sufficient back pressure to the regulator improves engine performance as well as extends the usable volume of the compressible fuel in the tank.

Additionally, as the pressure in the first chamber 802 and/or the amount of the compressible fuel in the first chamber 802 increases, the barrier 808 may move to reduce the volume of the second chamber 806. The pressure in the first chamber 802 may be substantially maintained as the volume of the first chamber 802 increases.

For example, the volume of the first chamber 802 may increase in response to exposure to thermal loading. The accumulator 804 allows the compressible fuel to expand under thermal loading while maintaining a safe pressure in the first chamber 802. Having an expandable first chamber 802 may reduce or eliminate bleeding the compressible fuel when the accumulator 804 increases in temperature. The accumulator 804 may include a piston accumulator, a bladder accumulator, a diaphragm accumulator, or any of the accumulators described herein with reference to FIGS. 3A-5.

Figure 8A:
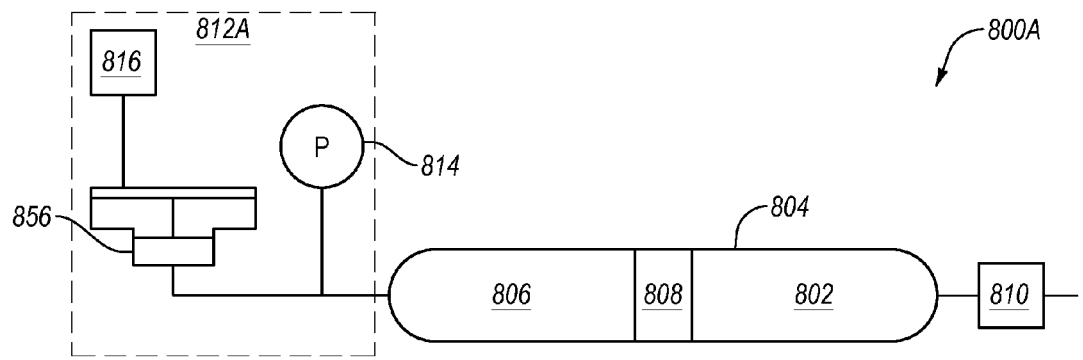
FIGS. 8A-8E illustrate block diagrams of example embodiments of compressible fuel tank backpressure regulators.

In each of FIGS. 8A-8E examples of the supply systems 812A-812E are depicted. The supply systems 812A-812E may regulate and/or provide the working fluid to the second chamber 806. FIG. 8A depicts an embodiment in which a supply system 812A includes an air system. The air system 812A includes a pressure gauge 814, an intensifier 856, and a source 816. The source 816 may include a compressor or an air brake system, for instance.

Figure 8B:
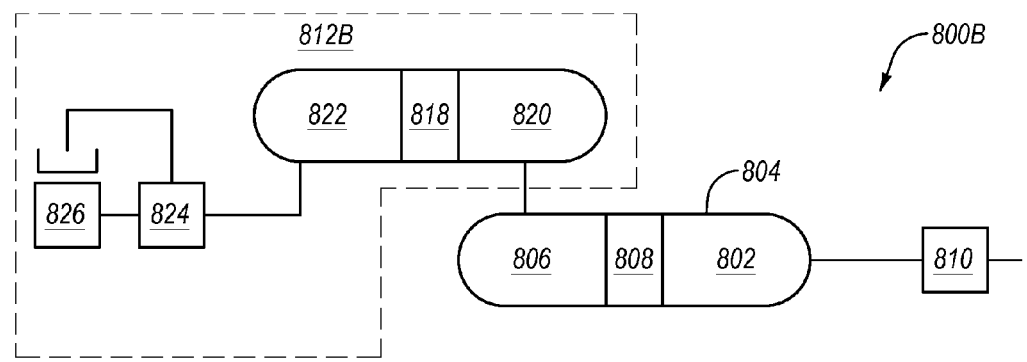
Figure 8C:
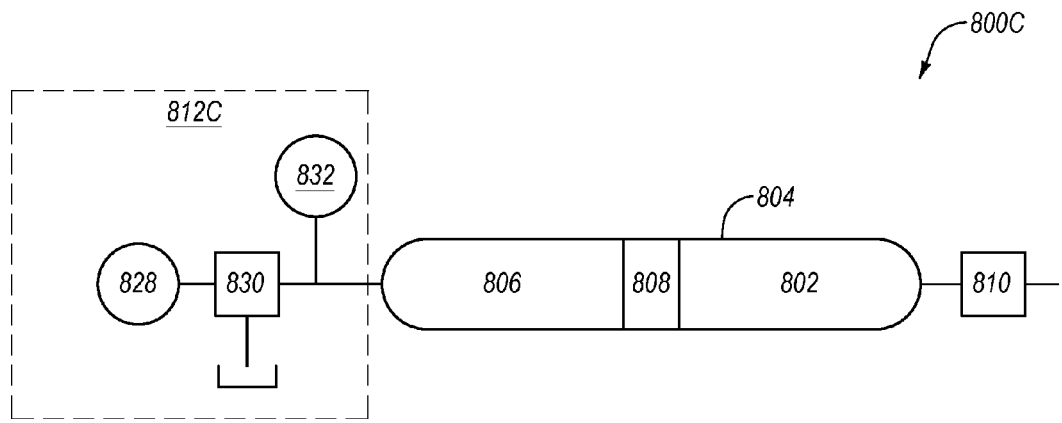
Figure 8D:
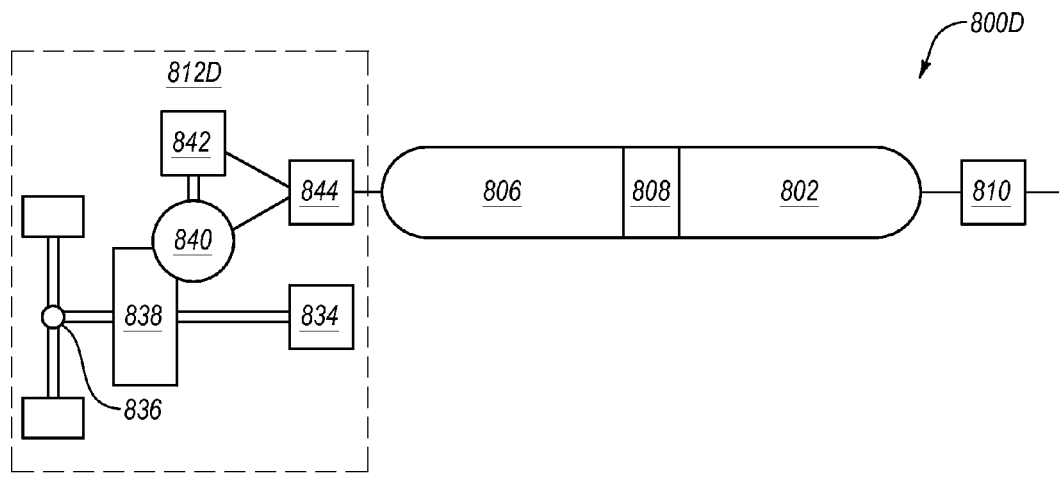
Figure 8E:
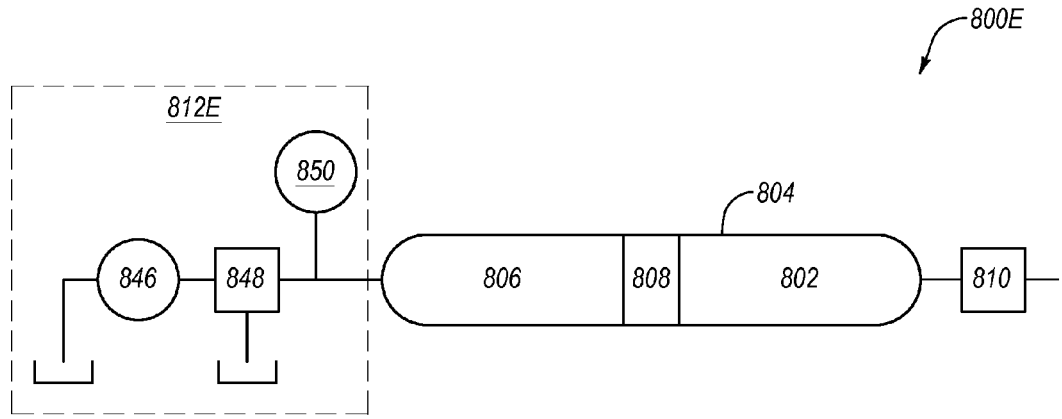

FIG. 8B depicts an embodiment in which a supply system 812B includes a secondary accumulator system. The supply system 812B may include a second variable-volume accumulator 818. A second chamber 820 of the second variable-volume accumulator 818 may be hydraulically coupled to the second chamber 806 of the accumulator 804. A first chamber 822 of the second variable-volume accumulator 818 may be coupled to a control valve 824, which may be further coupled to a hydraulic system 826. In some embodiments, the hydraulic system 826 may be included in a hydraulic hybrid system. FIG. 8C depicts an embodiment in which a supply system 812C includes a compressed air system. The supply system 812C includes an air compressor 828, a control valve 830, and a pressure gauge 832. The air compressor 828 may be an accessory in a hydraulic hybrid system. FIG. 8D depicts an embodiment in which a supply system 812D includes a primary vehicle drive system. The supply system 812D may include an energy source 834, an output 836, and a transmission 838. The transmission 838 drives a hydraulic pump/motor 840 which pumps hydraulic fluid from a reservoir 842 through a control valve 844 to the second chamber 806. FIG. 8E depicts an embodiment in which a supply system 812E includes a hydraulic system. The supply system 812E includes a hydraulic pump/motor 846, a control valve 848, and a pressure gauge 850. The hydraulic pump/motor 846 may be an accessory in a hydraulic hybrid system.

Figure 9:
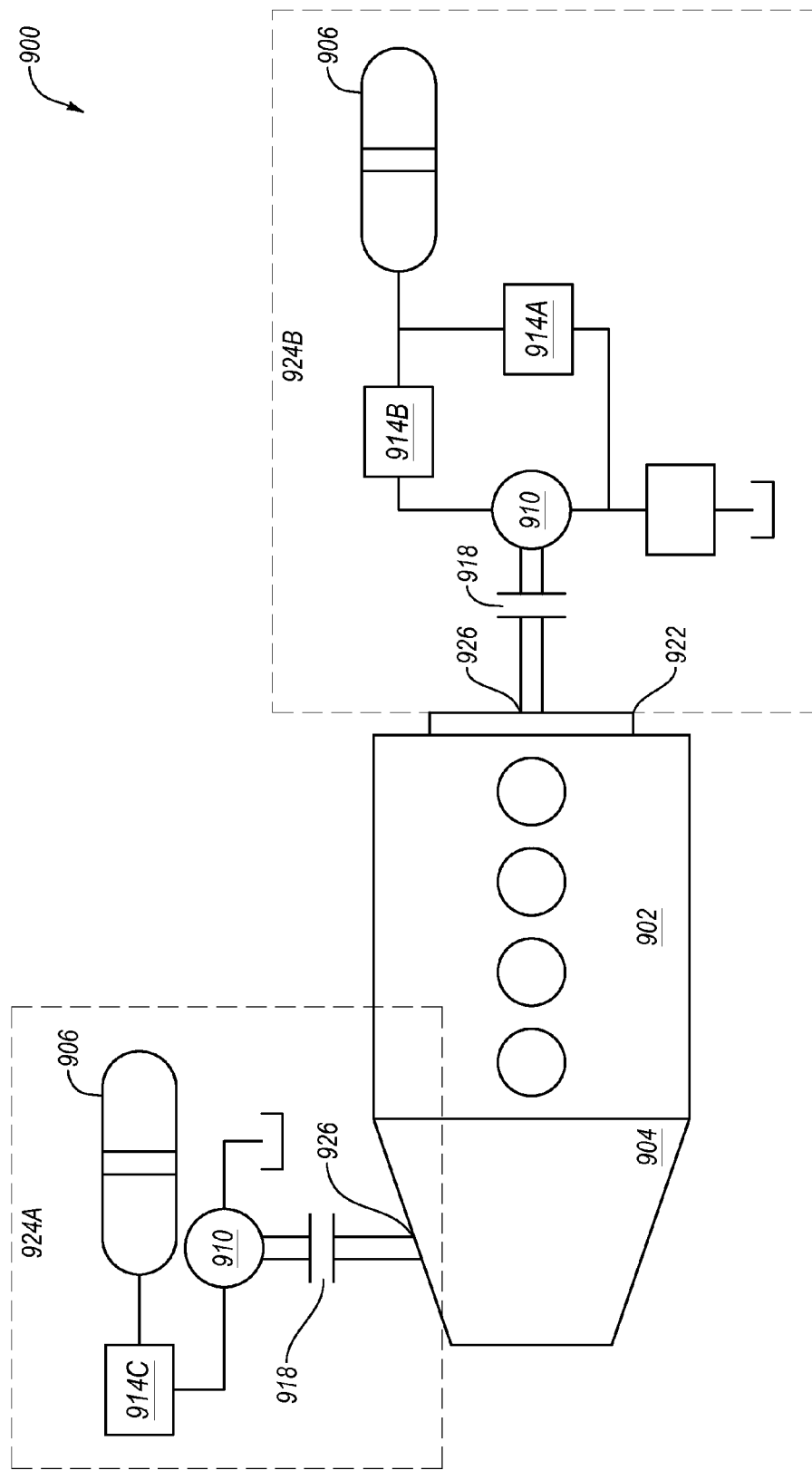
FIG. 9 illustrates a block diagram of an embodiment of a hydraulic hybrid system that may be implemented in an example mechanized vehicle.

FIG. 9 illustrates an embodiment of a hydraulic hybrid system 900 that may be implemented in an example mechanized vehicle. The mechanized vehicle may include a primary engine 902 and a vehicle transmission 904. The rest of the mechanized vehicle is not depicted in FIG. 9. The primary engine 902 may include a diesel engine, an electric motor, a gasoline engine, a CNG engine, hybrid combinations thereof (e.g., flex fuel and hybrid drives) or any other suitable energy source used in mechanized vehicles. The vehicle transmission 904 generally refers to a transmission configured in part to transfer rotational energy produced by the primary engine 902 for movement of the mechanized vehicle. The vehicle transmission 904 may be configured as an automatic (e.g., auto-shifting), a manual transmission (e.g., user shifted), or a hybrid transmission, without limitation. The hydraulic hybrid system 900 includes two hydraulic systems 924A and 924B. In some embodiments, the hydraulic hybrid system 900 may include one of the two hydraulic systems 924A or 924B.

The hydraulic systems 924A and 924B include an accumulator 906, a hydraulic pump/motor 910, a clutch 918, a PTO 926, and one or more valves 914A-914C. The hydraulic pump/motor 910 may include any of the hydraulic motors (e.g., the hydraulic motor 116 of FIG. 1) discussed herein. For example, the hydraulic pump/motors may include a variable-volume over center pump/motor or a constant volume pump/motor. The clutch 918 may include any of the clutches (e.g., the clutch 124) discussed herein. The valves 914A-914C may include directional, flow, and/or pressure-limiting valve.

The PTO 926 may be to the vehicle transmission 904 as in a first hydraulic system 924A or to the primary engine 902 as in a second hydraulic system 924B. When the clutch 918 is engaged, the vehicle transmission 904 or the primary engine 902 drives the hydraulic pump/motor 910. The hydraulic pump/motor 910 pumps a working fluid into the accumulator 906. For example, the hydraulic pump/motor 910 may pump the working fluid to the accumulator 906 during deceleration or while the primary engine 902 is spinning. The clutch 918 and/or the valves 914A-914C may be controlled by a controller such as the controller 112 of FIG. 1.

The working fluid may then be discharged to the hydraulic pump/motor 910. In the first hydraulic system 924A, the hydraulic pump/motor 910 may drive the vehicle transmission 904 via the PTO 926 and the clutch 918. The hydraulic pump/motor 910 may alternatively drive a drive shaft coupled to or included in the vehicle transmission 904.

In the second hydraulic system 924B, the hydraulic pump/motor 910 may drive the primary engine 902 via the clutch 918 and the PTO 926. The hydraulic pump motor 910 may drive a crank shaft or a rotor axle (represented in FIG. 9 by item 922) of the primary engine 902.

In the first hydraulic system 924A or the second hydraulic system 924, the discharged working fluid may create assistance to primary engine, which may reduce load and fuel consumption. Additionally or alternatively, the discharge of the working fluid may be used as a motor to act as a starter, which may allow the primary engine 902 to be shut off during certain idle situations.

Figure 10:
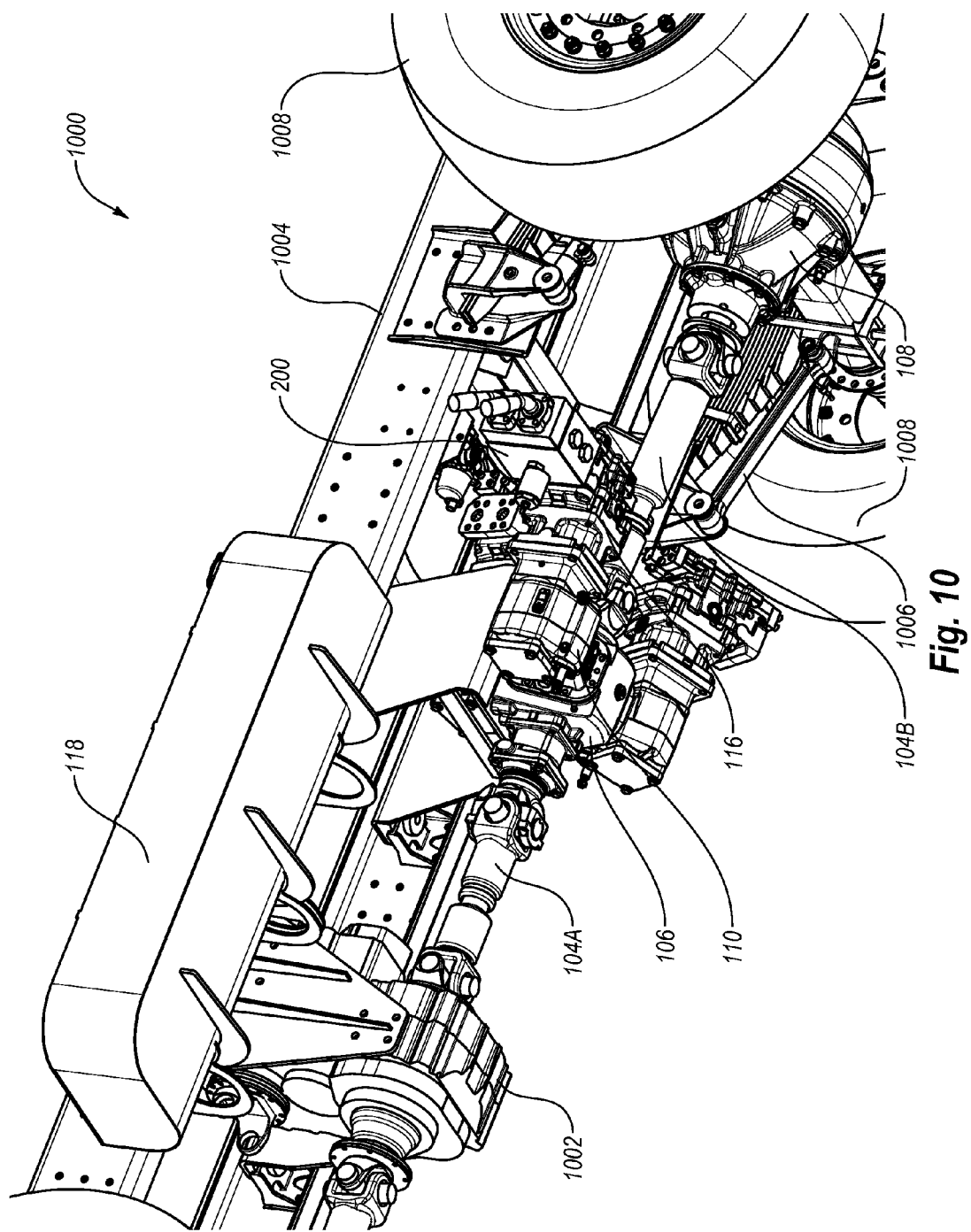
FIG. 10 illustrates the hydraulic hybrid system retrofit to a vehicle.

FIG. 10 illustrates the hydraulic hybrid system 100 of FIG. 1 retrofit to a vehicle 1000. A majority of the vehicle 1000 is not shown. Specifically, FIG. 10 is a bottom-perspective view of the vehicle 1000 with the body and cab omitted. A frame 1004, rear suspension 1006, and rear tires 1008 are included in FIG. 10.

The vehicle 1000 generally includes an engine (not shown), a transmission (not shown), and a planetary gearbox 1002. The engine, the transmission, and the planetary gearbox 1002 generally correspond to the energy source 102. The output of the planetary gearbox 1002 is the first shaft section 104A of the shaft 104. The first shaft section 104A is coupled to the throughput transmission 106. The throughput transmission 106 is coupled to the PTO 110. The PTO 110 is coupled to the hydraulic motor 116. The hydraulic motor 116 is coupled to the valve assembly 200. Two hydraulic lines couple the valve assembly 200 to the reservoir 118. The output 108 includes a rear differential in the illustrated embodiment.

This configuration is not meant to be limiting. In some embodiments the throughput transmission 106 may be close coupled to the planetary gearbox 1002 or an equivalent mechanism.

In this and other embodiments, the accumulator assembly may be submerged inside the reservoir 118. This may provide optimal use of space for the hydraulic hybrid system 100 and may allow access of internal valves included in the accumulator assembly to the reservoir 118. Submerging the accumulator assembly in the reservoir 118 may allow stable charge air temperatures and conservation of vehicle mounting space. Moreover, charging of the accumulators can be internal to the reservoir 118. Additionally or alternatively, plumbing between the reservoir 118 and an accumulator assembly are routed external to the reservoir. In some embodiments, accumulator mounts that may be configured to provide vibration and shock isolation to the accumulator assembly may be internal to the reservoir 118.

Figure 11:
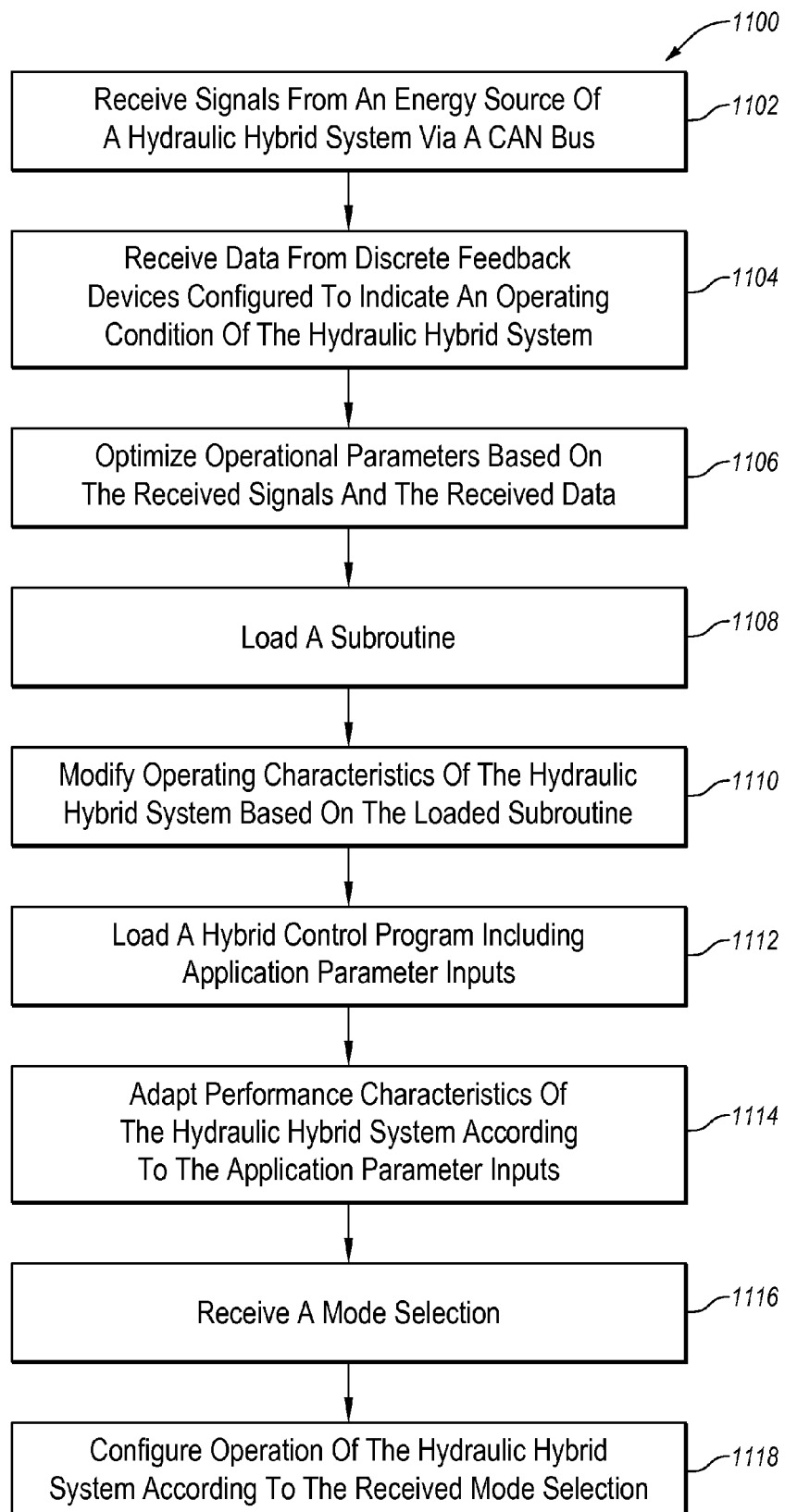
FIG. 11 is a flow diagram of an example method for controlling a hydraulic hybrid system, all arranged in accordance with at least one embodiment described herein.

FIG. 11 is a flow diagram of an example method 1100 for controlling a hydraulic hybrid system, arranged in accordance with at least one embodiment described herein. The method 1100 may be programmably performed in some embodiments by a controller such as the controller 112 or a control module such as the control module 130 described with reference to FIG. 1. The controller and/or the control module may include or may be communicatively coupled to a non-transitory computer-readable medium (e.g., the memory 132 of FIG. 1) having stored thereon or encoded therein programming code or instructions that are executable by a processor to perform or cause performance of the method 1100. The controller and/or the control module may include a processor (e.g., the processor 134 of FIG. 1) that is configured to execute computer instructions to cause or control performance of the method 1100. Although illustrated as discrete blocks, various blocks may be divided into additional blocks, combined into fewer blocks, or eliminated, depending on the desired implementation.

At block 1102, signals may be received from an energy source of a hydraulic hybrid system via a CAN bus. At block 1104, data may be received from one or more discrete feedback devices configured to indicate an operating condition of the hydraulic hybrid system. At block 1104, one or more settings or operational states in the hydraulic hybrid system may be adjusted based on the received signals and the received data. At block 1106, one or more operational parameters may be optimized based on the received signals and/or the received data.

At block 1108, a subroutine may be loaded. At block 1110, operating characteristics of the hydraulic hybrid system may be modified based on the loaded subroutine. For example, the subroutine may include a primary throttle subroutine calibrated to the position of the accelerator pedal and hydraulic potential energy stored in the accumulator assembly. In the primary throttle subroutine, a throttle signal, which controls fuel management to the engine, may be adjusted to decrease an amount of fuel required to move the vehicle at a rate indicated by a position of the accelerator pedal from 100% to 0% based upon an amount of hydraulic potential energy stored in the accumulator assembly. When there is enough hydraulic potential energy to propel the vehicle forward at a desired rate, the throttle signal communicated to the engine is delayed or reduced until the hydraulic potential energy is expended and/or the operator returns the accelerator pedal to a reduced position. When the hydraulic potential energy is expended or there is insufficient hydraulic potential energy to drive the vehicle, the throttle signal is returned to a value based solely on the position of the accelerator pedal. Additionally or alternatively, the subroutine may include a traction control subroutine. In the traction control subroutine, a first wheel speed sensor monitors front wheel speed and a second wheel speed sensor monitors rear wheel speed. When the front wheel speed differs from the rear wheel speed by more than a predetermined threshold value, a torque applied to rear wheels may be adjusted to reduce slip of the rear wheels. The torque may be adjusted by manipulation of the variable-displacement hydraulic motor or through reducing discharge of hydraulic potential energy from the accumulator assembly, for instance.

At block 1112, a hybrid control program may be loaded that includes application parameter inputs. At block 1114, performance characteristics of the hydraulic hybrid system may be adapted according to the application parameter inputs. In some embodiments, the adaptation of the performance characteristics may be performed manually and/or automatically. The parameter inputs may include parameter input configured to adapt controls of the hydraulic hybrid system according to positional signals received from a GPS sensor/receiver and data signals input from the CAN bus and/or other discrete feedback devices. For example, the positional signals may be compared with fuel efficiency data logged along one or more specific routes. Stop densities of the specific routes may be determined, which may include how frequently the vehicle stops. One or more sets of controls for the routes having based on the stop densities.

Additionally or alternatively, the parameter input may adapt controls of the hydraulic hybrid system based on dynamic statistical modeling during one or more routes. Specifically, how the operator is braking and accelerating as well as a frequency of stops may be monitored. Incremental changes may be made to the capture and discharge characteristics of the hydraulic hybrid system based on the monitored braking and accelerating.

Additionally or alternatively, the parameter input may adapt controls based on a combination of vehicle weight and a current vehicle speed. The vehicle weight may be ascertained by monitoring tire pressures and/or may be estimated based on arm dump cycles. As the vehicle weight increases or decreases and as the vehicle speed increases or decreases, a total amount of rotational energy stored as hydraulic potential energy as well as the energy discharged may be adapted.

At block 1116, a mode selection may be received. At block 1118, the operation of the hydraulic hybrid system may be configured according to the received mode selection. For example, the mode may include an eco mode configured to operate the hydraulic hybrid system in a manner to conserve fuel and limit power, a boost mode configured to operate the hydraulic hybrid system to provide extra power to an output, and a standard mode configured to operate the hydraulic hybrid system in a manner to provide a combination of performance and fuel savings.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A hydraulic hybrid system configured for implementation in a machine, the system comprising:
   a hydraulic system including a primary hydraulic pump/motor that is hydraulically coupled to a reservoir and a variable-volume accumulator assembly, wherein:
      the variable-volume accumulator assembly includes two or more accumulators that are separated by sequencing valves configured such that the two or more accumulators are discharged in a discharge sequence in which a first accumulator of the two or more accumulators is discharged until a first pressure in the first accumulator is at an equilibrium with a second pressure of a second accumulator of the two or more accumulators and at least during some portion of a period during which the first pressure is at the equilibrium with the second pressure, the first accumulator and the second accumulator are discharged together,
      the primary hydraulic pump/motor is configured to charge the two or more accumulators of the variable-volume accumulator assembly with a working fluid when mechanically driven, and
      a storage volume of the variable-volume accumulator assembly varies based on a kinetic output condition of the machine;
   an energy source configured to produce primary kinetic energy;
   an output configured to receive at least a first portion of the primary kinetic energy; and
   a transmission coupled between the energy source and the output and selectively coupled to the primary hydraulic pump/motor, wherein the transmission is configured to mechanically drive the primary hydraulic pump/motor using a second portion of the primary kinetic energy.

2. The system of claim 1, wherein:
   the hydraulic system includes an auxiliary hydraulic pump/motor coupled to an accessory and one or more control valves;
   the auxiliary hydraulic pump/motor hydraulically is coupled to the variable-volume accumulator assembly and the primary hydraulic pump/motor; and
   the primary hydraulic pump/motor, the variable-volume accumulator assembly, and the one or more control valves are configured to regulate discharge of the working fluid provided to the auxiliary hydraulic pump/motor such that operation of the accessory is substantially consistent.

3. The system of claim 2, wherein:
   the accessory includes an electric generator coupled to a battery assembly which is configured to be electrically coupled to a motor;
   the operation of the accessory includes an optimized charge of the battery assembly; and
   the energy source includes the motor.

4. The system of claim 1, further comprising an accessory selectively coupled to the primary hydraulic pump/motor such that when the accessory is coupled to the primary hydraulic pump/motor, rotation of the primary hydraulic pump/motor is translated to the accessory, wherein:
   the hydraulic system includes one or more control valves; and the primary hydraulic pump/motor, the variable-volume accumulator, and the one or more control valves are configured to regulate discharge of the working fluid to the primary hydraulic pump/motor such that the operation of the accessory due to rotation of the primary hydraulic pump/motor is substantially consistent.

5. The system of claim 1, wherein:
the first accumulator includes a first chamber configured to receive a compressible fuel and a second chamber separated from the first chamber by a barrier, and
the second chamber is configured such that varying an amount of a working fluid in the second chamber varies a volume of the first chamber.

6. The system of claim 1, wherein:
the primary hydraulic pump/motor is further configured to drive the output via the transmission when hydraulically driven; and
the variable-volume accumulator assembly is configured to discharge the working fluid from the accumulator to hydraulically drive the primary hydraulic pump/motor.

7. The system of claim 6, wherein:
the first accumulator includes a first chamber configured to receive the working fluid, a second chamber configured to impose a pre-charge pressure on the first chamber, and a third chamber configured such that varying a control fluid in the third chamber adjusts the pre-charge pressure imposed by the second chamber.

8. A hydraulic hybrid system comprising:
an energy source that is configured to produce primary kinetic energy;
an output configured to receive at least a first portion of the primary kinetic energy;
a hydraulic system including:
    a variable-volume accumulator assembly that includes two or more accumulators that are separated by sequencing valves configured such that the two or more accumulators are discharged in a discharge sequence in which a first accumulator of the two or more accumulators is discharged until a first pressure in the first accumulator is at an equilibrium with a second pressure of a second accumulator of the two or more accumulators and at least during some portion of a period during which the first pressure is at the equilibrium with the second pressure, the first accumulator and the second accumulator are discharged together;
    a hydraulic pump/motor configured to be hydraulically driven by discharging a working fluid stored in the variable-volume accumulator assembly and coupled between the energy source and the output;
    a reservoir configured to store and to provide the working fluid to the hydraulic system; and
    one or more control valves coupled between the hydraulic pump/motor, the reservoir, and the variable-volume accumulator assembly, the control valve configured such that when the hydraulic pump/motor is driven, the working fluid is ported from the reservoir to the variable-volume accumulator assembly; and when the variable-volume accumulator assembly is discharging the working fluid, the working fluid is ported from the variable-volume accumulator assembly to the hydraulic pump/motor; and
a transmission coupled between the energy source and the output and selectively coupled to the hydraulic pump/motor, wherein the transmission is configured to mechanically drive the hydraulic pump/motor using a second portion of the primary kinetic energy.

9. The system of claim 8, wherein the two or more accumulators include:
a first chamber configured to receive the working fluid;
a second chamber configured to impose a pre-charge pressure on the first chamber; and
a third chamber configured such that when a control fluid is pumped into the third chamber, the pre-charge pressure imposed by the second chamber increases and when the control fluid is bled from the third chamber, the pre-charge pressure imposed by the second chamber is decreased.

10. The system of claim 9, wherein:
the first chamber is separated from the second chamber by a first piston barrier;
the first piston barrier is configured to move to adjust a first volume of the first chamber and a second volume of the second chamber and to stop moving when a first pressure in the first chamber is substantially equal to a second pressure in the second chamber;
the second chamber is separated from the third chamber by a second piston barrier; and
the second piston barrier is configured to move to adjust the second volume of the second chamber and a third volume of a third chamber and to stop moving when the second pressure in the second chamber is substantially equal to a third pressure in the third chamber.

11. The system of claim 9, further comprising a control fluid supplied to the third chamber at a regulated charge pressure, wherein:
the regulated charge pressure is configured to move a second piston barrier separating the third chamber from the second chamber toward a first piston barrier separating the second chamber from the first chamber as the working fluid is discharged from the first chamber; and
the third chamber includes a filling valve configured to be closed off at the regulated charge pressure as the working fluid is added to the first chamber.

12. The system of claim 8, wherein:
the two or more accumulators having differing volumes
the sequencing valves are configured to individually hydraulically isolate each of the two or more accumulators from a remainder of the hydraulic system.

13. The system of claim 12, wherein the pressures of the two or more accumulators and operation of the sequencing valves are controlled by one or more operating conditions of the energy source and the output.

14. The system of claim 12, wherein operation of the sequencing valves are further configured such that the two or more accumulators are charged in a charge sequence.

15. The system of claim 14, wherein the charge sequence includes:
the first accumulator being charged to a particular pressure; and
following charge of the first accumulator and based on operating conditions of one or more or a combination of the energy source, the output, the hydraulic system, and the transmission, the second accumulator being charged.

16. The system of claim 8, further comprising a controller configured to receive data indicating operational conditions of the engine, the differential, and the shaft via discrete feedback devices and a controller area network (CAN) bus.

17. The system of claim 8, further comprising a controller configured to receive data indicating operational conditions of the energy source, the output, and the variable-volume accumulator assembly via discrete feedback devices and a controller area network (CAN) bus.

18. A hydraulic hybrid system comprising:
a hydraulic system including:
- a variable-volume accumulator assembly that includes two or more accumulators that are separated by sequencing valves configured such that the two or more accumulators are discharged in a discharge sequence in which a first accumulator of the two or more accumulators is discharged until a first pressure in the first accumulator is at an equilibrium with a second pressure of a second accumulator of the two or more accumulators and at least during some portion of a period during which the first pressure is at the equilibrium with the second pressure, the first accumulator and the second accumulator are discharged together;
- a reservoir;
- one or more control valves;
- a primary hydraulic pump/motor that is hydraulically coupled to the variable-volume accumulator assembly, the control valves, and the reservoir; and a transmission coupled between an energy source and an output and selectively coupled to the primary hydraulic pump/motor, wherein:
- the transmission is configured to mechanically drive the primary hydraulic pump/motor using a portion of primary kinetic energy generated by the energy source;
- the primary hydraulic pump/motor is configured to charge the variable-volume accumulator assembly with a working fluid when mechanically driven;
- a storage volume of the variable-volume accumulator assembly varies based on a kinetic output condition of the energy source, and
- the variable-volume accumulator assembly is configured to discharge the working fluid to the primary hydraulic pump/motor.

19. The system of claim 18, further comprising an auxiliary hydraulic pump/motor coupled to an accessory and one or more control valves, wherein:
- the auxiliary hydraulic pump/motor hydraulically is coupled to the variable-volume accumulator assembly and the primary hydraulic pump/motor,
- the primary hydraulic pump/motor, the variable-volume accumulator assembly, and the one or more control valves are configured to regulate discharge of the working fluid provided to the auxiliary hydraulic pump/motor such that operation of the accessory is substantially consistent,
- the accessory that includes an electric generator coupled to a battery assembly, and
- the operation of the accessory includes an optimized charge of the battery assembly.

20. The system of claim 18, wherein:
the two or more accumulators have differing volumes; and
the sequencing valves are configured to individually hydraulically isolate the two or more accumulators from a remainder of the hydraulic system based on pressures in the two or more accumulators.

* * * * *